United States Patent
Spreine et al.

(10) Patent No.: US 9,784,391 B2
(45) Date of Patent: Oct. 10, 2017

(54) METHOD AND APPARATUS FOR FITTING A SLEEVE

(71) Applicant: The Boeing Company, Chicago, IL (US)

(72) Inventors: Daniel G. Spreine, Lynnwood, WA (US); Jeffrey Wayne Hamilton, Renton, WA (US); David Scott Wright, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 631 days.

(21) Appl. No.: 14/052,541

(22) Filed: Oct. 11, 2013

(65) Prior Publication Data
US 2015/0101176 A1    Apr. 16, 2015

(51) Int. Cl.
F16L 31/00    (2006.01)
F16L 21/06    (2006.01)

(52) U.S. Cl.
CPC ....... *F16L 21/065* (2013.01); *Y10T 29/49826* (2015.01); *Y10T 29/49872* (2015.01); *Y10T 29/49895* (2015.01); *Y10T 29/49924* (2015.01); *Y10T 29/49947* (2015.01); *Y10T 29/49959* (2015.01); *Y10T 29/53657* (2015.01)

(58) Field of Classification Search
CPC .............. F16L 21/065; Y10T 29/49895; Y10T 29/49924; Y10T 29/49826; Y10T 29/49872; Y10T 29/49947; Y10T 29/49959
See application file for complete search history.

(56) References Cited

U.S. PATENT DOCUMENTS

| 6,880,859 B2 | 4/2005 | Breay et al. |
| 6,908,123 B2 | 6/2005 | Le |
| 6,991,269 B2 | 1/2006 | Legeai et al. |
| 7,144,047 B2 | 12/2006 | Dole |
| 2006/0017280 A1* | 1/2006 | Ball ......... F16L 17/10 285/15 |
| 2012/0124804 A1* | 5/2012 | Vandal ...... F16L 17/04 29/428 |

FOREIGN PATENT DOCUMENTS

| EP | 0545410 B1 | 3/1992 |
| KR | 20020023933 | * 3/2002 |

OTHER PUBLICATIONS

"XRP Clamshell Couplings—Wiggins / Hydraflow", Midwest Performance Hardware MPH, 2007, 6 pages, Sep. 13, 2013, www.mphindy.com/prods/plumbing/clamshell.htm.

* cited by examiner

*Primary Examiner* — John C Hong
(74) *Attorney, Agent, or Firm* — Yee & Associates, P.C.

(57) ABSTRACT

Illustrative Embodiments may provide for an apparatus and method for fitting a first tube to a second tube. The apparatus may have a first section and a second section. The first section and the second section may engage each other to form a spreine. Each section may engage a sleeve. The spreine may encircle the sleeve encircling the first tube. The spreine may include a slider that may receive a force that may move the spreine and the sleeve, engaged within the spreine, and fit the first tube to the second tube. Fitting the first tube to the second tube may include engaging the sleeve with a first O-ring that may encircle a first ferrule in the first tube, and the sleeve simultaneously engaging a second O-ring encircling a second ferrule in a second tube.

17 Claims, 14 Drawing Sheets

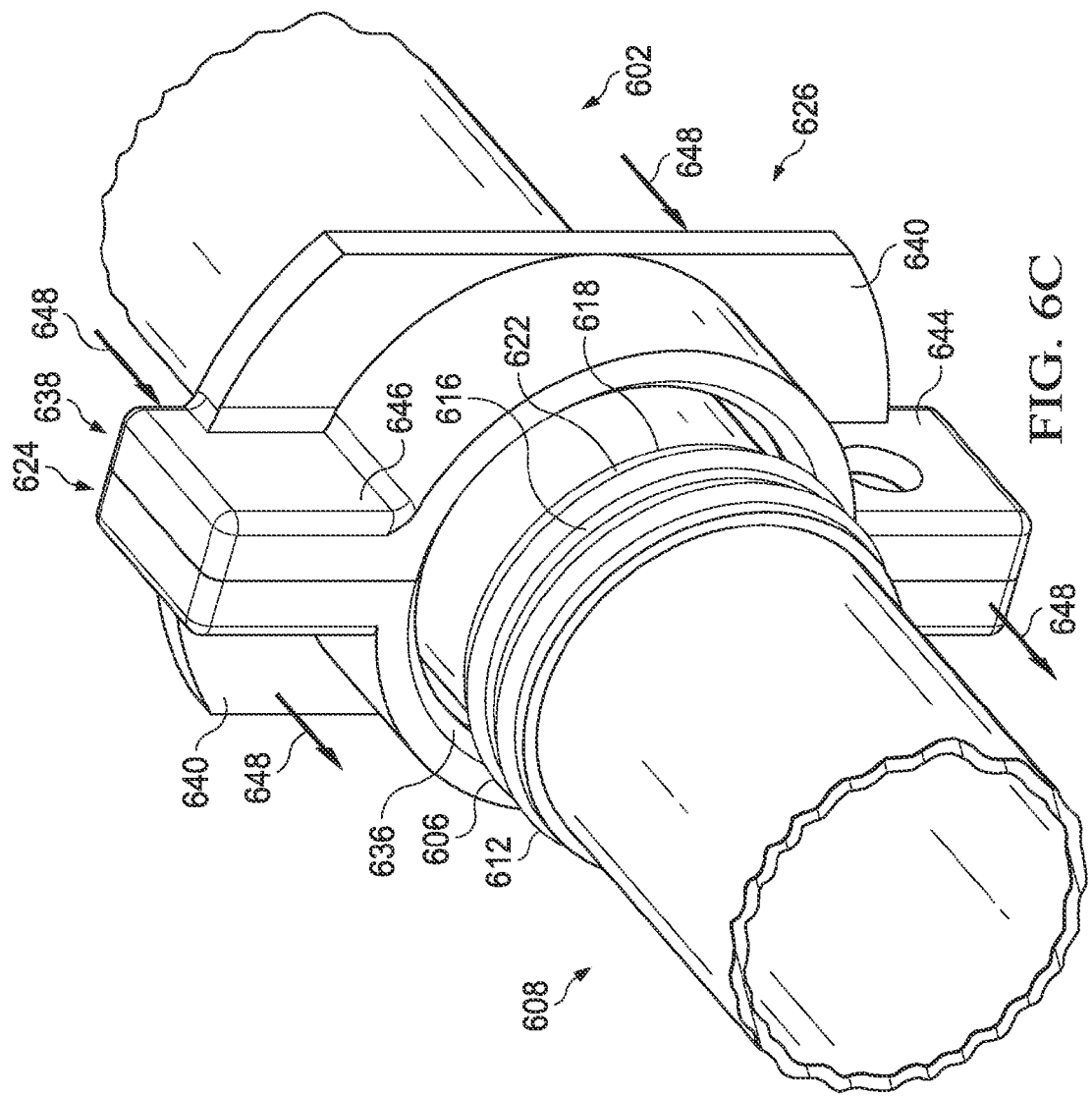

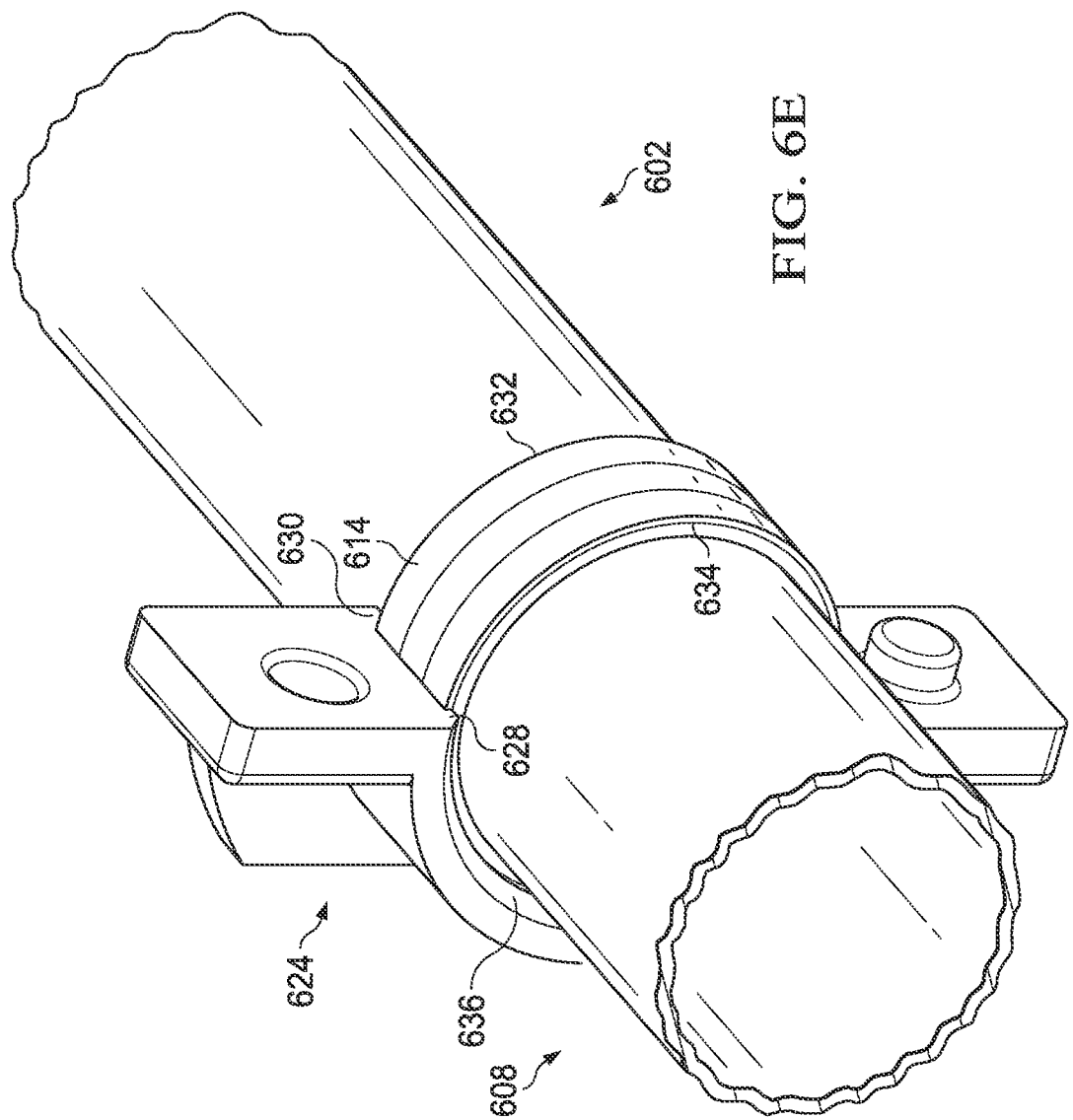

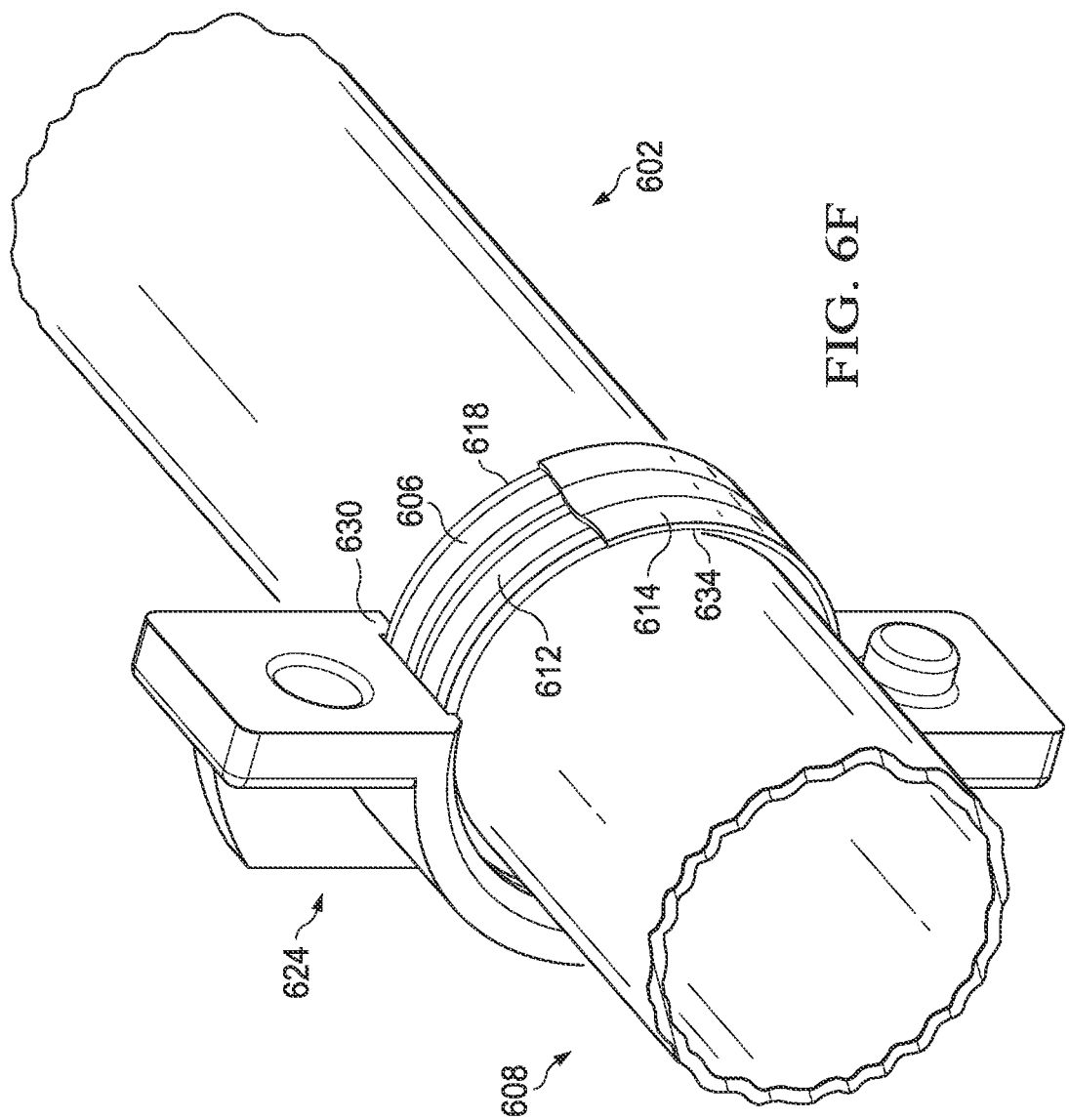

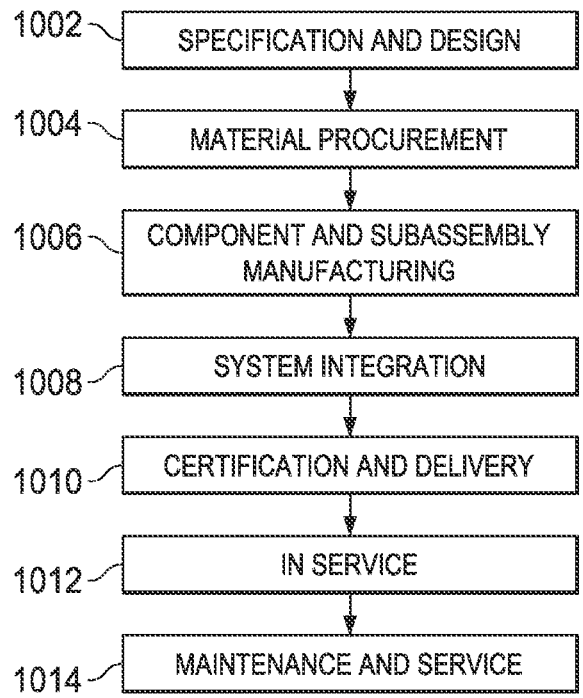
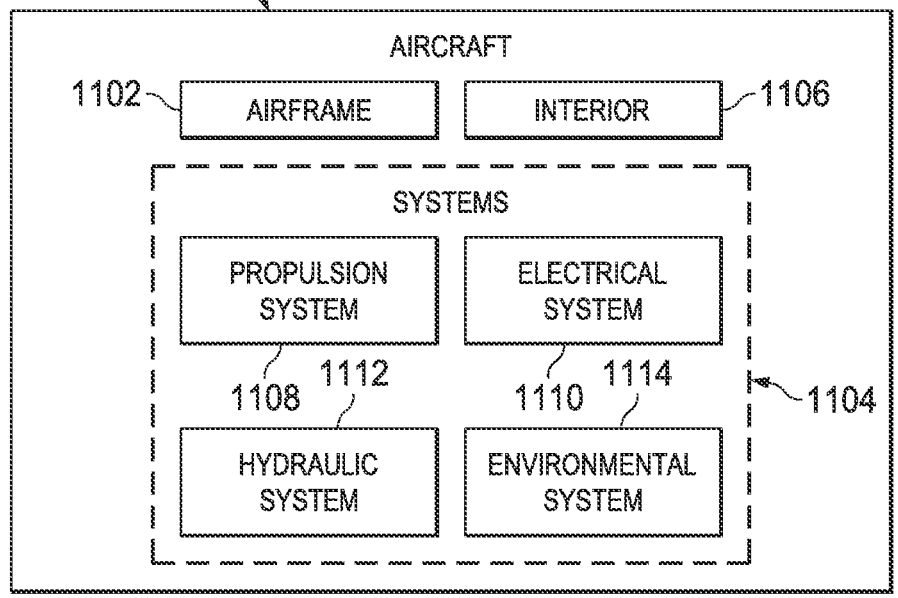

METHOD AND APPARATUS FOR FITTING A SLEEVE

BACKGROUND INFORMATION

1. Field

The present disclosure relates generally to coupling tubes together. In particular, the present disclosure relates to a method and apparatus for placing a sleeve to fit a first tube to a second tube.

2. Background

A first tube may be fitted to a second tube. A first end of a first tube and a second end of a second tube may each include a fitting, such as a ferrule. Each ferrule may have an annular groove and an O-ring seated in the groove. A circumference of each O-ring may extend beyond an outer surface of the ferrule. To fit the end of the first tube to the end of the second tube, a metal sleeve, of annular cross-section, may be commonly slid over a first O-ring in a first ferrule of the first tube, and then slid over a second O-ring in a second ferrule of the second tube, such that the first and second O-rings both remain within the sleeve.

Typically, the sleeve may be moved by a technician grasping an outer face of the sleeve by hand and tugging or pushing the sleeve across the O-rings. As tube and sleeve diameters increase, a technician may need to use two hands to grasp the sleeve. It can be very difficult for a technician to keep a central axis aligned with a central axis of the tubes and O-rings while trying to move the sleeve by hand. A clamshell coupling or pipe sleeve seal may often be fastened about the sleeve to secure the sleeve to the respective ends of the first and second tubes, and to join the two tubes to function as a single extended tube.

Some sleeves are formed from thin metal that may catch on or damage the O-ring as the sleeve may be fitted over the O-ring. When the sleeve catches on the O-ring, the O-ring can also become dislodged from the annular groove. Further, if the sleeve becomes misaligned and becomes non-coaxial with the fitting, the sleeve must be removed and replaced to be coaxial with the flexible tubes.

In some cases, the sleeve may have such a large diameter (i.e., 4 inches) that it may be difficult for an installer to grasp and hold on to as it may be slid over the O-ring and fitting. The above-mentioned problems become more pronounced for larger diameter sleeves, and installation of a sleeve to fit the first tube to the second tube may take up to 4 hours. During this installation time, the O-ring may need to be re-seated or replaced and/or the sleeve may need to be removed and realigned several times.

To facilitate installing large diameter sleeves, installers have attempted to improvise with tools on-hand. Installers have used nylon scrapers and metal hammers, but this solution has not sufficiently sped up the installation process and, in some cases, has caused injuries during installation. In some conditions, damage may occur to a tube being fitted, or to other aircraft components.

Therefore, it would be desirable to have a method and apparatus that takes into account at least some of the issues discussed above, as well as other possible issues.

SUMMARY

Illustrative embodiments may provide for a method of connecting a first tube to a second tube. The method of connecting a first tube to a second tube may include encircling, with a spreine, a sleeve encircling the first tube, by connecting a first section of a spreine to a second section of the spreine; aligning the first tube with the second tube; moving the spreine such that the sleeve encircles the first tube and the second tube; and removing the spreine. The method of connecting a first tube to a second tube may further include clamping the sleeve to the first tube and the second tube, via a clamp around the sleeve.

Illustrative embodiments may provide for a method of fitting a sleeve about a first end of a first tube and a second end of a second tube. The method of fitting a sleeve about a first end of a first tube and a second end of a second tube may include: encircling the first tube with the sleeve, such that a leading face of the sleeve and a trailing face of the sleeve each fully encircle a portion of the first tube, the trailing face being farther from the first end than a distance from the leading face to the first end of the first tube; engaging the sleeve with a first section of a spreine; engaging the sleeve and the first section with a second section of the spreine; forming, via engaging the first section with the second section, a first grip of the spreine and a second grip of the spreine; aligning the first end with the second end; and fitting, using the spreine, the first tube to the second tube, via the sleeve.

The first end further may include a first ferrule. The second end further may include a second ferrule. The first ferrule may retain a first O-ring and the second ferrule may retain a second O-ring.

The method of fitting a sleeve about a first end of a first tube and a second end of a second tube may further include axially aligning the first end with the second end. Engaging the first section with second section may include the first section and the second section being shaped substantially identical, and a nub on a first extension of the second section engaging a slot in a second extension of the first section, forming the first grip. The nub on the first extension of the first section may engage the slot in the second extension of the second section and may form the second grip.

The method of fitting a sleeve about a first end of a first tube and a second end of a second tube may further include removing the spreine from the sleeve; and clamping the sleeve to the first tube and the second tube, via a clamp around the sleeve. The method may further include a distance from the first end to the second end being less than a length of the sleeve.

Fitting the sleeve may further include moving the spreine toward the second tube such that the leading face encircles the second tube and the trailing face encircles the first tube. Engaging the sleeve may further include locating the leading face of the sleeve within a chamber of the spreine.

Moving the spreine may include the spreine receiving a force on at least one of: the first grip, the second grip, and a slider. The chamber may exist between a starter rim and a stopper rim. The trailing face may receive force through contact with the stopper rim.

The starter rim may include a beveled face; the beveled face may be configured including: a first radius to an inner edge of the beveled face being less than a second radius to an interior face of the sleeve, and an increasing radius axially along the beveled face to an outer edge. The outer edge may include a third radius that may be greater than a fourth radius to an interior face of a barrel. The method of fitting a sleeve about a first end of a first tube and a second end of a second tube may include stopping the spreine from moving toward the second tube by contacting a forward face of the stopper rim against a first retainer of the first ferrule.

Illustrative embodiments may provide for an apparatus that may include two physically separate sections. A first section may be shaped substantially identical to a second section. Each section may include an arch, a starter ridge, and a stopper ridge. Each section may be configured: to engage a sleeve, and combine with the other section to form the barrel. The barrel may be configured to form a chamber that may be configured to: receive, transfer force to the sleeve such that a first tube may be connected to a second tube via the sleeve.

The apparatus may also include each section configured, when engaged with another section and the sleeve, to move the sleeve from a first position encircling the first tube to a second position encircling the first tube and the second tube, such that a first O-ring remains in a first groove in a first ferrule of the first tube and a second O-ring remains in a second groove in a second ferrule in the second tube. Each section may include a first extension comprising a nub, and a second extension comprising a slot. The first section may be configured to engage with the second section. The nub on the first extension of the second section may be configured to engage with the slot on the second extension of the first section and form a first grip. The slot of the second extension of the second section may be configured to engage with the nub on the first extension of the first section and form a second grip.

The apparatus may include the chamber existing between a starter rim and a stopper rim within the barrel. The starter rim may include a beveled face. The beveled face may include: a first radius to an inner edge of the beveled face being less than a second radius to an interior face of the sleeve, and an increasing radius axially along the beveled face to an outer edge, the outer edge comprising a third radius being greater than a fourth radius to an interior face of the barrel.

The features and functions can be achieved independently in various embodiments of the present disclosure or may be combined in yet other embodiments in which further details can be seen with reference to the following description and illustrations.

BRIEF DESCRIPTION OF THE ILLUSTRATIONS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying illustrations, wherein:

Figure 6A:
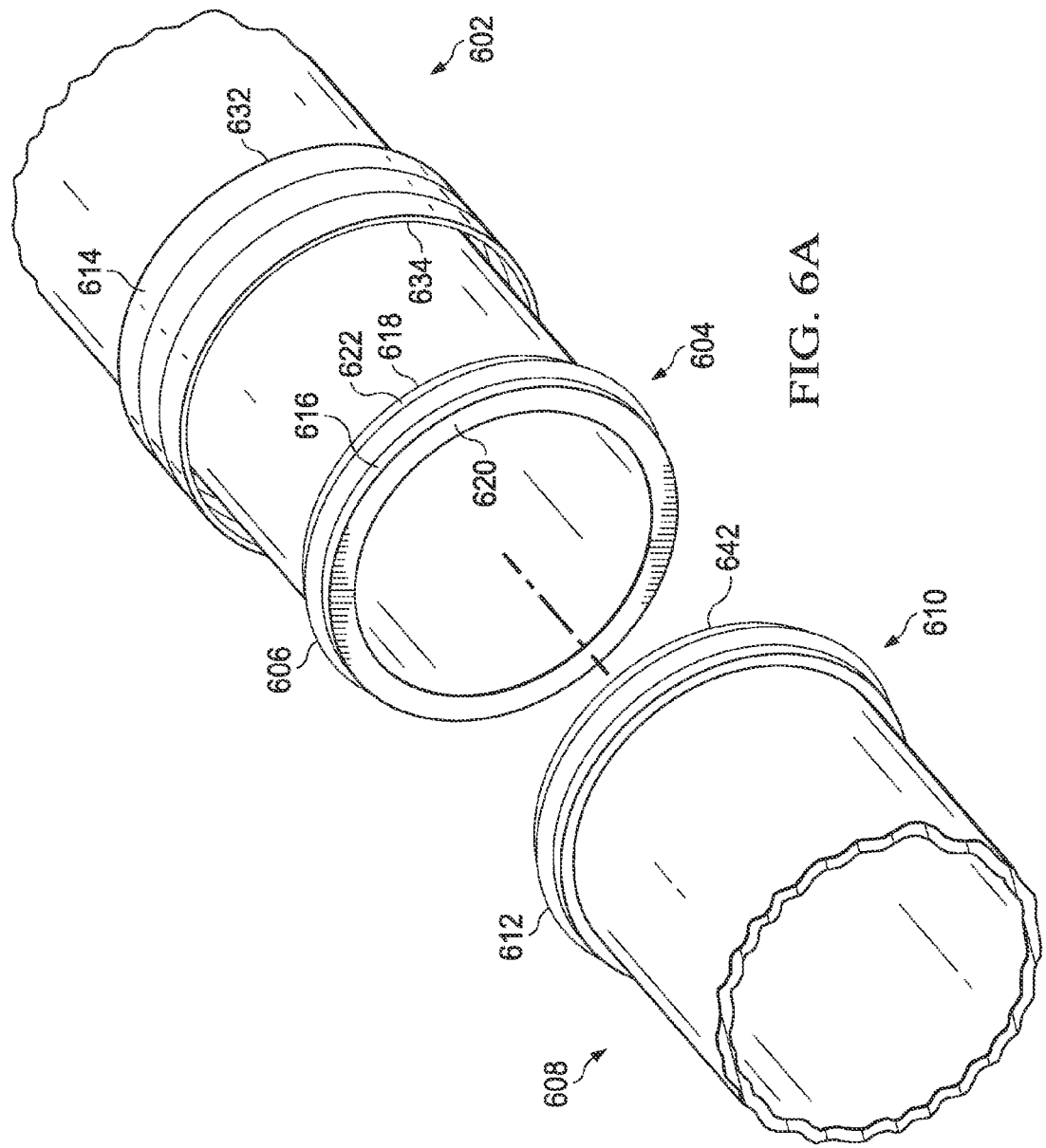
Figure 6B:
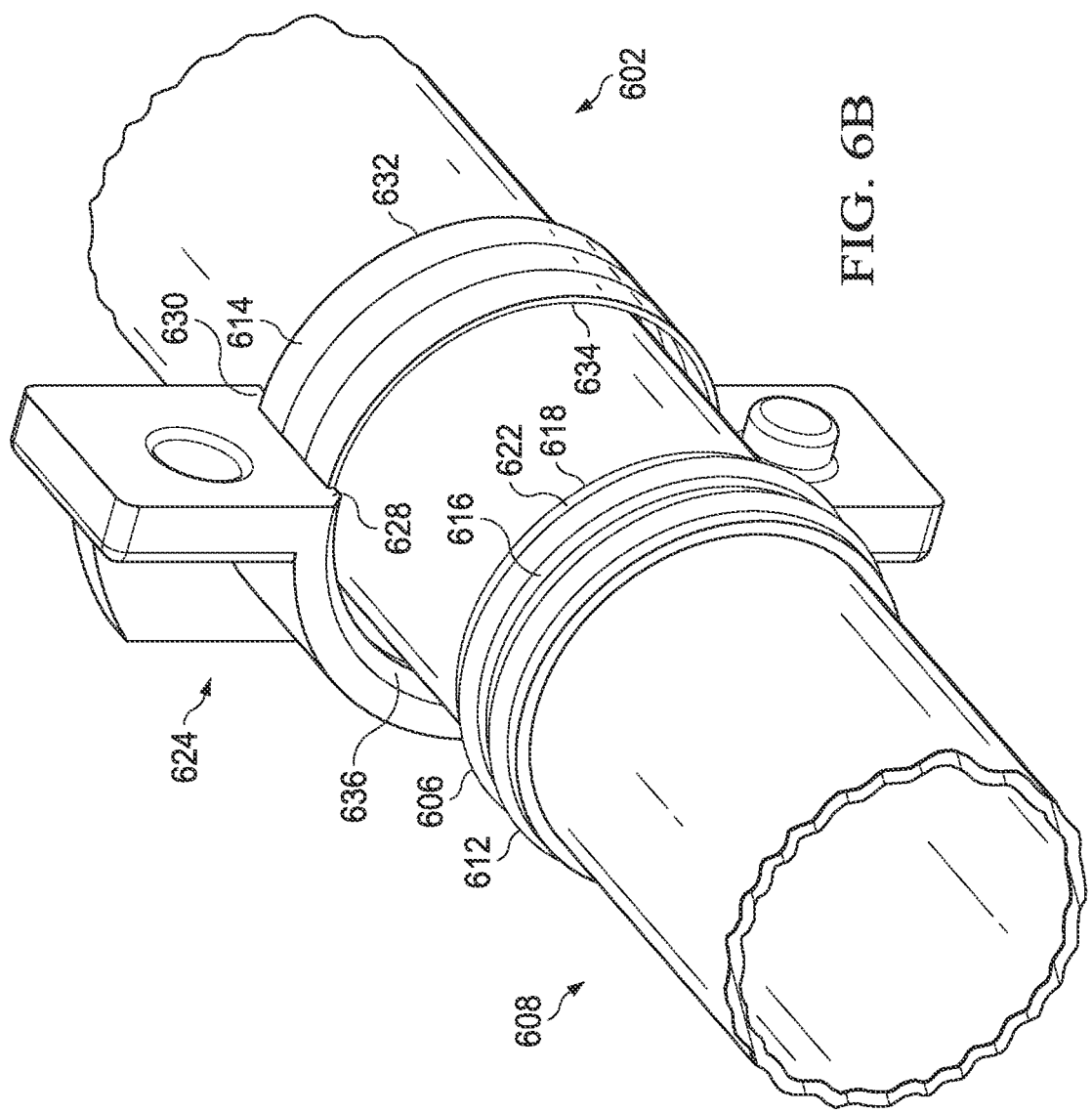
Figure 6D:
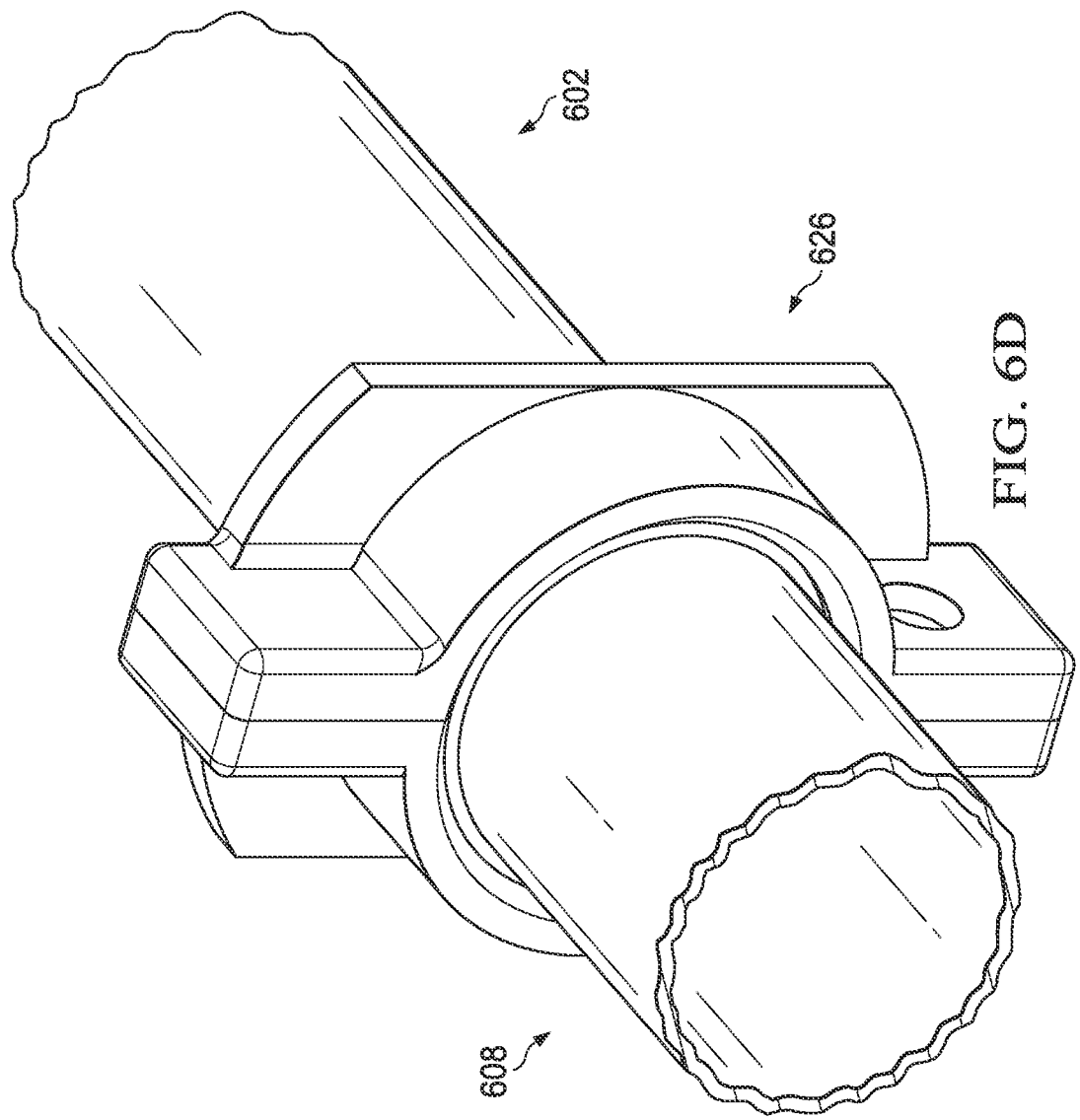

FIG. 6 is an illustration, in an isometric view, of fitting a first tube to a second tube, using an apparatus to move a sleeve encircling the first tube, in accordance with an advantageous embodiment. FIG. 6 is presented as FIG. 6A through FIG. 6F; FIG. 6A is an illustration, in an isometric view, of a first tube and a second tube, with a sleeve encircling the first tube, in accordance with an advantageous embodiment; FIG. 6B is an illustration, in an isometric view, of a first section of a spreine apparatus engaged with a sleeve before fitting a first tube to a second tube, in accordance with an advantageous embodiment; FIG. 6C is an illustration, in an isometric view, of a spreine just prior to a beveled face of the spreine contacting an O-ring of a first tube; FIG. 6D is an illustration, in an isometric view, of a spreine after fitting a first tube to a second tube using a sleeve, with a first section of the spreine joined to a second section of the spreine, encircling the sleeve; in accordance with an advantageous embodiment; FIG. 6E is an illustration, in an isometric view, of a sleeve fitting a first tube to a second tube, with a first section of a spreine engaged with the sleeve, in accordance with an advantageous embodiment; FIG. 6F is an illustration, in an isometric view, of a sleeve fitting a first tube to a second tube, with a first section of a spreine engaged with the sleeve presented in cutaway to afford a view of the sleeve contact with O-rings, in accordance with an advantageous embodiment.

Figure 7:
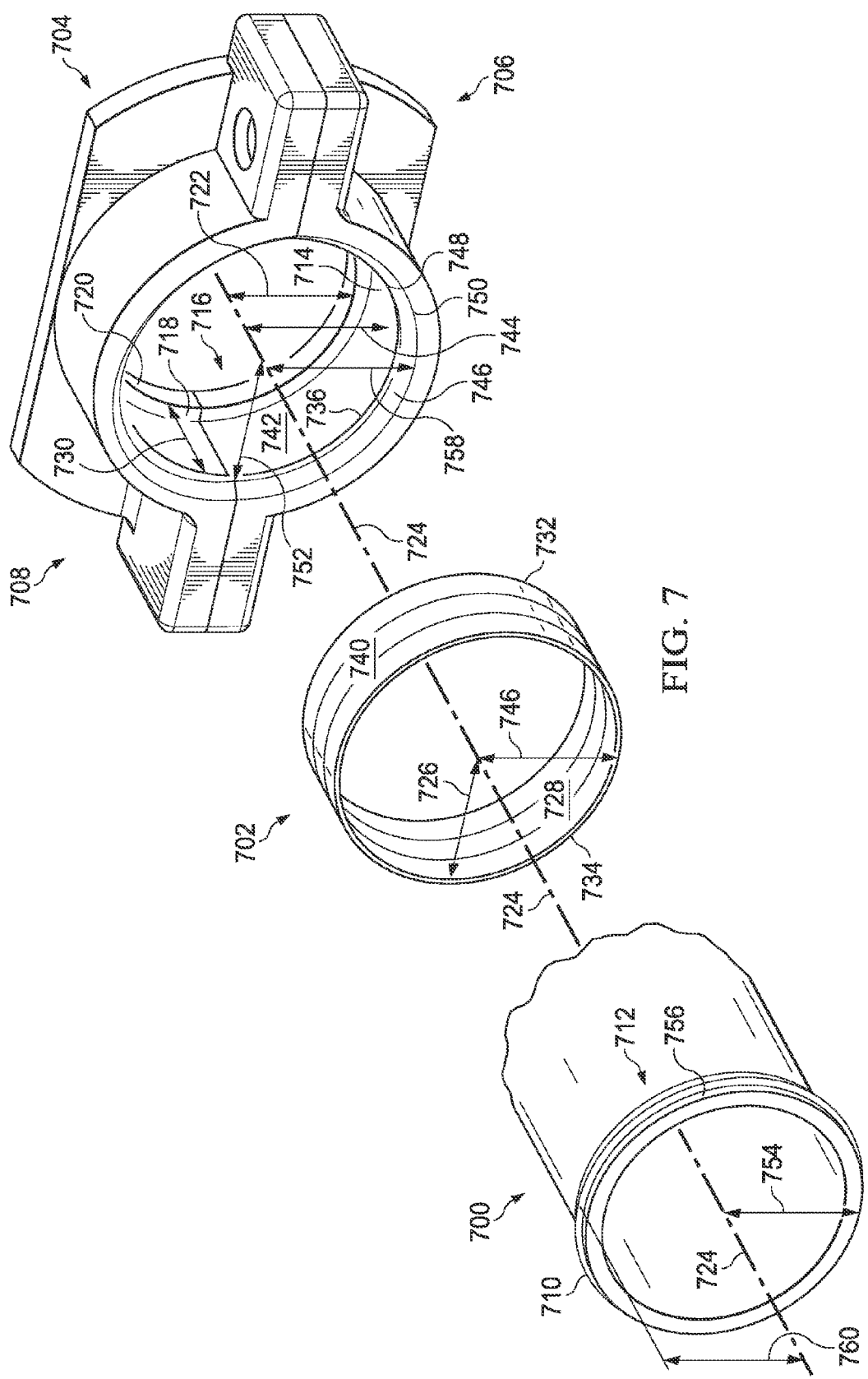
Figures 8, 9:
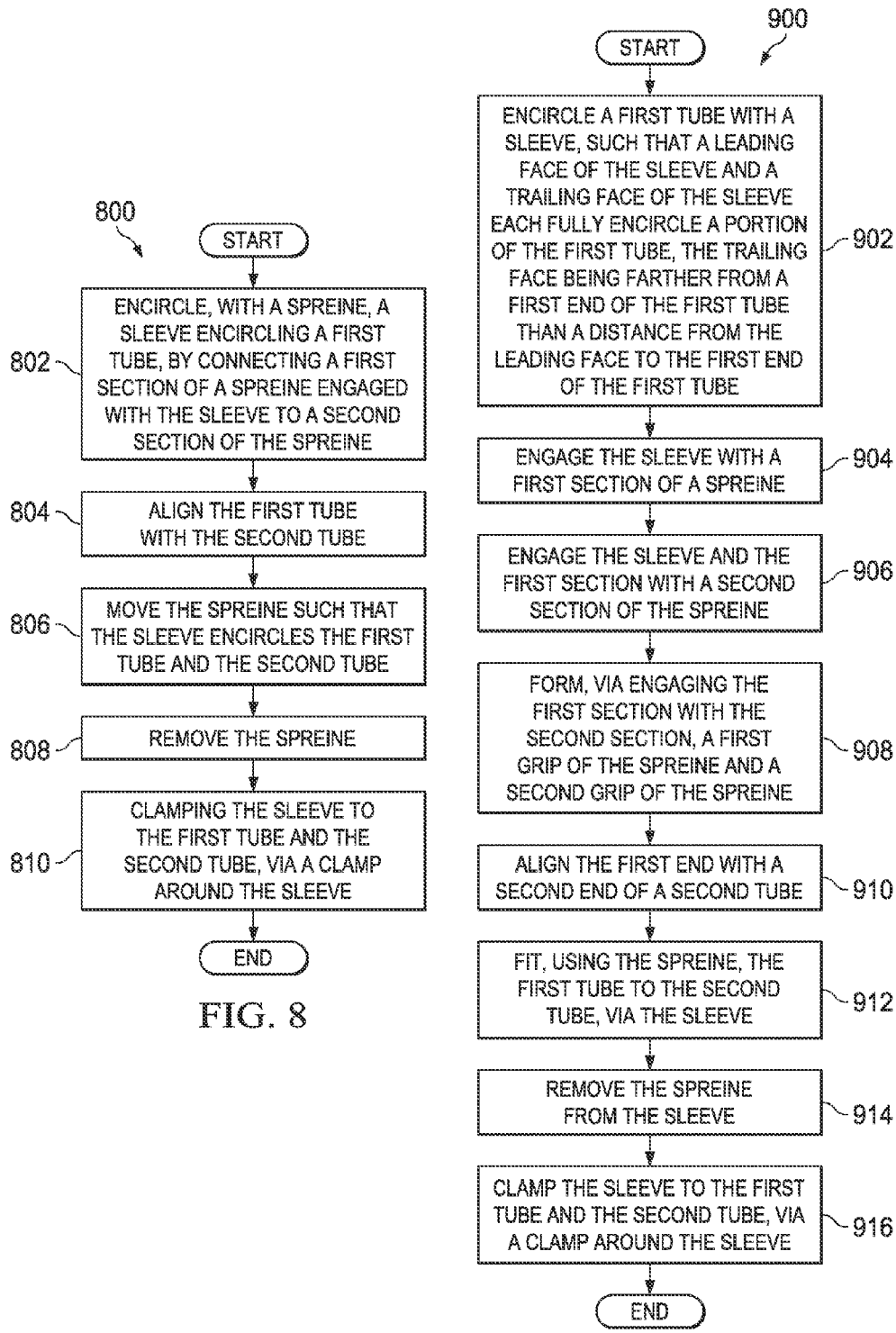

FIG. 7 is an illustration, in an isometric view, of a tube with a ferrule and an O-ring, a sleeve, and a spreine aligned to illustrate their proportions and features relative to each other;

FIG. 8 is an illustration, as a flowchart, of a process for connecting a first tube to a second tube, in accordance with an advantageous embodiment;

FIG. 9 is an illustration, as a flowchart, of a process for fitting a sleeve about a first end of a first tube and a second end of a second tube, in accordance with an advantageous embodiment.

FIG. 10 is an illustration of an aircraft manufacturing and service method in accordance with an advantageous embodiment;

FIG. 11 is an illustration of an aircraft in which an advantageous embodiment may be implemented

DETAILED DESCRIPTION

The illustrative embodiments recognize and take into account one or more different considerations. Tubes may exist that facilitate containment and/or transport of various items. Without limitation, the illustrative embodiments recognize and take into account that a tube may facilitate transport and/or containment of a gas or a fluid and accordingly, tubes may possess a range of circumferences and different rigidity.

The illustrative embodiments recognize and take into account that a first tube may need to be joined to a second tube. Without limitation, the illustrative embodiments recognize and take into account that fuel lines may need to be fitted together.

The illustrative embodiments recognize and take into account that various sizes of the disclosed tool may be needed to accommodate various sizes of tubes that may need to be connected. Sliding, without a grasping tool, a sleeve with a diameter larger than about four inches may be quite, if not overwhelmingly, difficult.

The illustrative embodiments recognize and take into account that a tube end may be fitted with a ferrule, and that a ferrule may facilitate fitting one tube to another tube.

Without limitation, a flexible tube end may have a rigid ferrule attached to facilitate fitting a first tube to a second tube. The illustrative embodiments recognize and take into account that a ferrule may include an annular groove that may accept an O-ring.

The illustrative embodiments recognize and take into account that currently, a first tube may be connected to a second tube by sliding a sleeve that encircles a first tube over a first O-ring in a first ferrule fitting on a first tube, then over a second O-ring in a second ferrule fitting on a second tube. Without limitation, a sleeve may be a hollow cylinder. A sleeve may include any material or shape that may facilitate fitting the first tube to the second tube. Without limitation, a sleeve may include materials or designs on an interior surface of a hollow cylinder that may facilitate fitting the first tube to the second tube. Without limitation, a sleeve may include materials or designs on an exterior surface of a hollow cylinder that may facilitate securing the sleeve in place with a clamp and/or coupling. Without limitation, an exterior of a sleeve may be banded to facilitate engaging with a trademarked Wiggins coupling.

The illustrative embodiments recognize that presently no tool exists to assist sliding a sleeve over both O-rings while maintaining a length of the sleeve substantially parallel to a central axis of each of the first ferrule fitting and the second ferrule fitting without dislodging or damaging an O-ring. An improperly aligned sleeve may result in a fitting that may leak, and thus need to be realigned properly.

The illustrative embodiments recognize and take into account that space available around the first tube and second tube may be limited and that clearance may not exist to approach the tubes with many existing tools. Some existing tools may crimp or clamp the sleeve. The illustrative embodiments recognize and take into account attempting to complete this task by using tools not designed for this task can result in damage to the first tube, the second tube, an O-ring, or adjacent components. Unless otherwise noted and where appropriate, similarly named features and elements of illustrative embodiments of one figure of the disclosure correspond to and embody similarly named features and elements of embodiments of the other figures of the disclosure.

Figure 1:
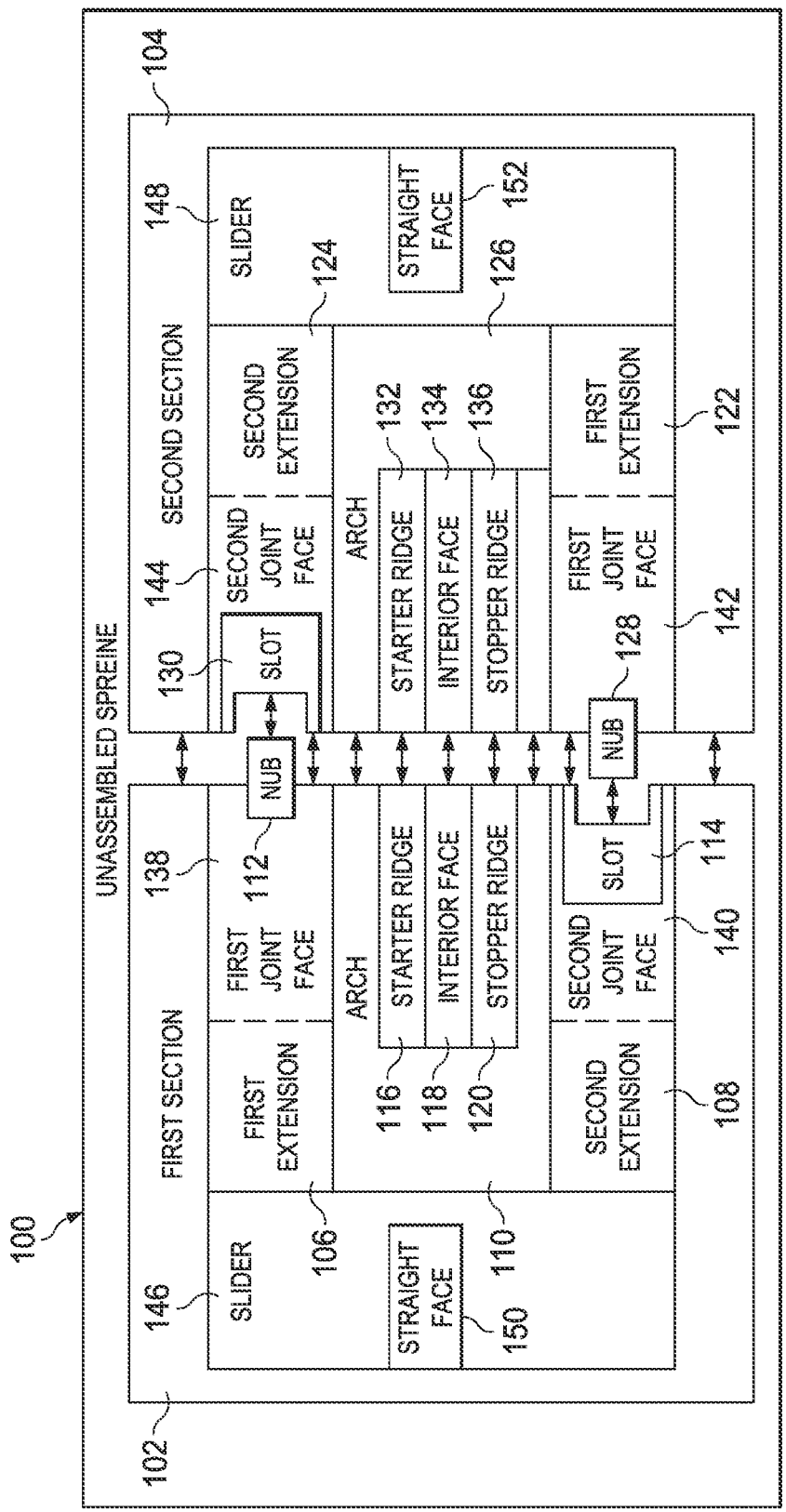
FIG. 1 is an illustration, in the form of a block diagram of a first section and a second section, separated, of an apparatus configured to fit a sleeve over a first tube and a second tube, in accordance with an advantageous embodiment.
Figure 2:
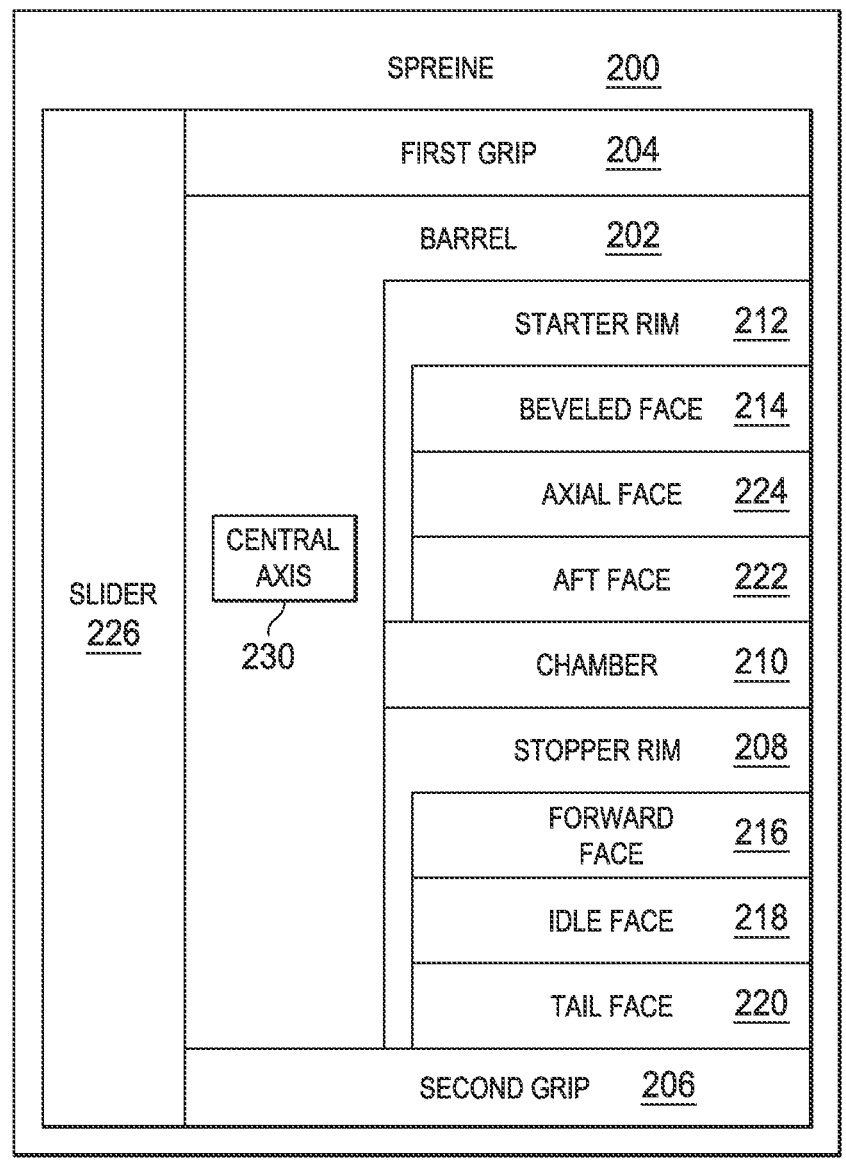
FIG. 2 is an illustration, in the form of a block diagram, of an apparatus configured to fit a sleeve over a first tube and a second tube, with a first section connected to a second section, in accordance with an illustrative embodiment.

With reference now to FIG. 1, FIG. 1 is an illustration, in the form of a block diagram, of a first section and a second section, separated, of an apparatus configured to fit a sleeve over a first tube and a second tube, in accordance with an advantageous embodiment. More specifically, FIG. 1 illustrates unassembled spreine 100. Unassembled spreine 100 may be used to fit tubes together during various operations as described below in FIG. 9, such as without limitation component and subassembly manufacturing 906. Spreine 200 as shown in FIG. 2 may be used to fit tubes together on aircraft 1100 as shown in FIG. 11 such as, without limitation, fuel lines in a propulsion system. Without limitation, spreine 200 may be used to place a sleeve to fit pneumatic tubes together in an environmental system, or to fit fluid lines together in a hydraulic system. Without limitation, spreine 200 may also be used to place a sleeve coupling conduit together in an electrical system.

While placing a sleeve to couple fuel lines may inhibit fluid from leaking out of the coupled fuel lines, placing a sleeve to couple electrical conduit may inhibit fluid from entering into the electrical conduit. Such electrical conduit may be located within or near a fluid, such as, without limitation, within or near a fuel tank or a hydraulic reservoir.

Unassembled spreine 100 may be an apparatus that may include first section 102 and second section 104. First section 102 may include: first extension 106, second extension 108, arch 110, and slider 146.

First extension 106 may include nub 112. Second extension 108 may contain slot 114. First extension 106 may be a protrusion from a portion of the circumference of arch 110. First extension 106 may protrude along an entire axial length of arch 110. First extension 106 may be shaped as a rectangular prism. First extension 106 may be oriented substantially orthogonally to a plane that may be substantially tangent to a circumference of arch 110. First extension 106 may have first joint face 138 that may be flush and contiguous with an annular width of arch 110.

Second extension 108 may be a protrusion from a portion of the circumference of arch 110. Second extension 108 may protrude along an entire axial length of arch 110. Second extension 108 may be shaped as a rectangular prism. Second extension 108 may be oriented substantially orthogonally to a plane that may be substantially tangent to a circumference of arch 110. Second extension 108 may have second joint face 140 that may be flush and continuous with the annular width of arch 110. First joint face 138 and second joint face 140 may each share a plane with a planar diameter of arch 110.

Arch 110 may include: starter ridge 116, interior face 118, and stopper ridge 120. Starter ridge 116 and stopper ridge 120 may each be substantially concentric with and contiguous to interior face 118 of arch 110.

Slider 146 may be a flange type extension from arch 110. Slider 346 may extend radially outward from a circumference of arch 110. Slider 146 may have straight face 150 that may be substantially parallel to a planar diameter of arch 310. Thus, straight face 150 of slider 146 may be substantially parallel to first joint face 338 and second joint face 140.

Stopper ridge 120 may be an extension from arch 110. Stopper ridge 120 may extend inwardly toward a central axis of arch 110 along an interior radius of arch 110 for a full arc of arch 110.

Interior face 118 may be a circumferential indentation in arch 110. Interior face 134 may be a circumferential indentation in arch 126.

Second section 104 may have a substantially identical form and be formed of substantially identical materials as or materials that vary from materials that form first section 102. Second section 104 may include: first extension 122, second extension 124, arch 126, and slider 148.

First extension 122 may include nub 128. Second extension 124 may contain slot 130. First extension 122 may be a protrusion from a portion of the circumference of arch 126. First extension 122 may protrude along an entire axial length of arch 126. First extension 122 may be shaped as a rectangular prism. First extension 122 may be oriented substantially orthogonally to a plane that may be substantially tangent to a circumference of arch 126. First extension 122 may have second joint face 144 that is flush and continuous with an annular width of arch 326.

Second extension 124 may be a protrusion from a portion of the circumference of arch 126. Second extension 124 may protrude along an entire axial length of arch 126. Second extension 124 may be shaped as a rectangular prism. Second extension 124 may be oriented substantially orthogonally to a plane that may be substantially tangent to a circumference of arch 126. Second extension 124 may have second joint face 144 that is flush and continuous with an annular width of arch 126. Second joint face 144 and first joint face 142 may each share a plane with a planar diameter of arch 126.

Arch 126 may include: starter ridge 132, interior face 134, and stopper ridge 136. Starter ridge 132 and stopper ridge 136 may each be substantially concentric with and contiguous to interior face 134 of arch 126.

Slider 148 may be a flange type extension from arch 126. Slider 148 may extend radially outward from a circumference of arch 126. Slider 148 may have straight face 152 that may be substantially parallel to a planar diameter of arch 126. Thus, the straight face 152 of slider 148 may be substantially parallel to second joint face 144 and first joint face 142.

Stopper ridge 136 may be an extension from arch 126. Stopper ridge 136 may extend inwardly toward a central axis of arch 126 along an interior radius of arch 126 for a full arc of arch 126.

Interior face 118 may be a circular recession in arch 110. Interior face 134 may be a circular recession in arch 126.

First section 102 may connect to second section 104. First section 102 may connect to second section 104 by first extension 106 connecting to second extension 124, and first extension 122 connecting to second extension 108. Nub 112 of first extension 106 of first section 102 may be of a size and a shape that may insert into slot 130 of second extension 124 of second section 104.

Nub 112 may be retained by slot 130. Without limitation, nub 112 may be a protrusion from first extension 106, and slot 130 may be an indentation in second extension 124. Nub 112 may be a cylindrical protrusion with a first diameter. Slot 130 may be a cylindrical indentation with a second diameter. The second diameter may be greater than the first diameter such that slot 130 may receive nub 112. The second diameter may be configured such that slot 130 may maintain a frictional retention of nub 112. Nub 112 may be a protrusion shaped other than cylindrically. Slot 130 may be any shape that may conform to shape of nub 112.

First section 102 and second section 104 may be of a substantially identical size and a substantially identical shape. First extension 122 may connect to second extension 108. Nub 128 of first extension 122 of second section 104 may be of a size and a shape that may insert into slot 114 of second extension 308 of first section 302.

Nub 128 may be retained by slot 114. Without limitation, nub 128 may be a protrusion from first extension 122, and slot 114 may be an indentation in second extension 108. Nub 128 may be a cylindrical protrusion with a first diameter. Slot 114 may be a cylindrical indentation with a second diameter. The second diameter may be greater than the first diameter such that slot 114 may receive nub 128. The second diameter may be configured such that slot 114 may maintain a frictional retention of nub 128. Nub 128 may be a protrusion shaped other than cylindrically. Slot 114 may be any shape that may conform to shape of nub 128.

With reference now to FIG. 2, FIG. 2 is an illustration, in the form of a block diagram, of an apparatus configured to fit a sleeve over a first tube and a second tube, with a first section connected to a second section, in accordance with an illustrative embodiment. More specifically, FIG. 2 illustrates, in the form of a block diagram, spreine 200. Spreine 200 may be formed when first section 102 of unassembled spreine 100 is connected to second section 104 of FIG. 1.

FIG. 2 may illustrate spreine 200 when first section 102 may be connected to second section 104 as shown in FIG. 1. Spreine 200 may include barrel 202, first grip 204, second grip 206, stopper rim 208, chamber 210, starter rim 212, and slider 226. Slider 226 may be formed when slider 146 and slider 148, as shown in FIG. 1, may be aligned and abutted to each other as first section 102 may be connected to second section 104.

First section 102 may connect to second section 104 such that arch 110 may align with arch 326, to form barrel 202. Arch 110 may abut arch 126.

First section 102 may connect to second section 104 such that stopper ridge 120 may align with stopper ridge 136 to form stopper rim 208. Stopper ridge 120 may align annularly with stopper ridge 136. Stopper ridge 120 may abut with stopper ridge 136.

Stopper rim 208 may include: forward face 216, idle face 218, and tail face 220. Stopper rim 208 may be a ring that may be substantially concentric with barrel 202. A circumference of stopper rim 208 may be contiguous with an interior face of barrel 202.

Forward face 216 may be a first radial face of stopper rim 208. Forward face 216 may be closer to starter rim 212 than tail face 220 is to forward face 216. Forward face 216 may engage an annular face of a sleeve.

Idle face 218 may be an axial face. Idle face 218 may be substantially parallel to an interior face of barrel 202. Tail face 220 may be a second radial face of stopper rim 208.

First section 102 may connect to second section 104 such that starter ridge 116 may align with starter ridge 132 to form starter rim 212. Starter ridge 116 may abut starter ridge 132.

Starter rim 212 may include beveled face 214, aft face 222, and axial face 224. Beveled face 214 may be formed from a first beveled surface of starter ridge 116 aligning with a second beveled surface of starter ridge 132. Each beveled surface may abut the other beveled surface. Axial face 224 of starter rim 212 may be substantially concentric with barrel 202. Axial face 224 may be substantially parallel to interior face of barrel 202. Aft face 222 may be a radial face.

First section 102 may connect to second section 104 such that interior face 118 may align with interior face 134, as in FIG. 1, to form chamber 210. Interior face 118 may abut interior face 134. Chamber 210 may be formed by an interior face of barrel 202, forward face 216, and aft face 222.

First extension 106 may connect with second extension 124 such that first joint face 138 may be adjacent to second joint face 144. First extension 306 may connect with second extension 124 such that first joint face 138 may abut second joint face 144. First extension 106 may connect with second extension 124 and form first grip 204.

First extension 122 may connect with second extension 308 such that first joint face 142 may be adjacent to second joint face 140. First extension 122 may connect with second extension 108 such that second joint face 140 may abut first joint face 142. First extension 122 may connect with second extension 108 and form second grip 206.

First grip 204 and second grip 206 may each extend outwardly from diametrically opposing locations along a circumference of barrel 202. First grip 204 and second grip 206 may each be shaped as a rectangular prism.

Slider 226 may be formed when slider 146 and slider 148, as shown in FIG. 1, may be aligned and abutted to each other as first section 102 may be connected to second section 104. Slider 226 may provide a surface to facilitate spreine 200 receiving a force that may move spreine 200 along central axis 230 of barrel 202.

Figure 3:
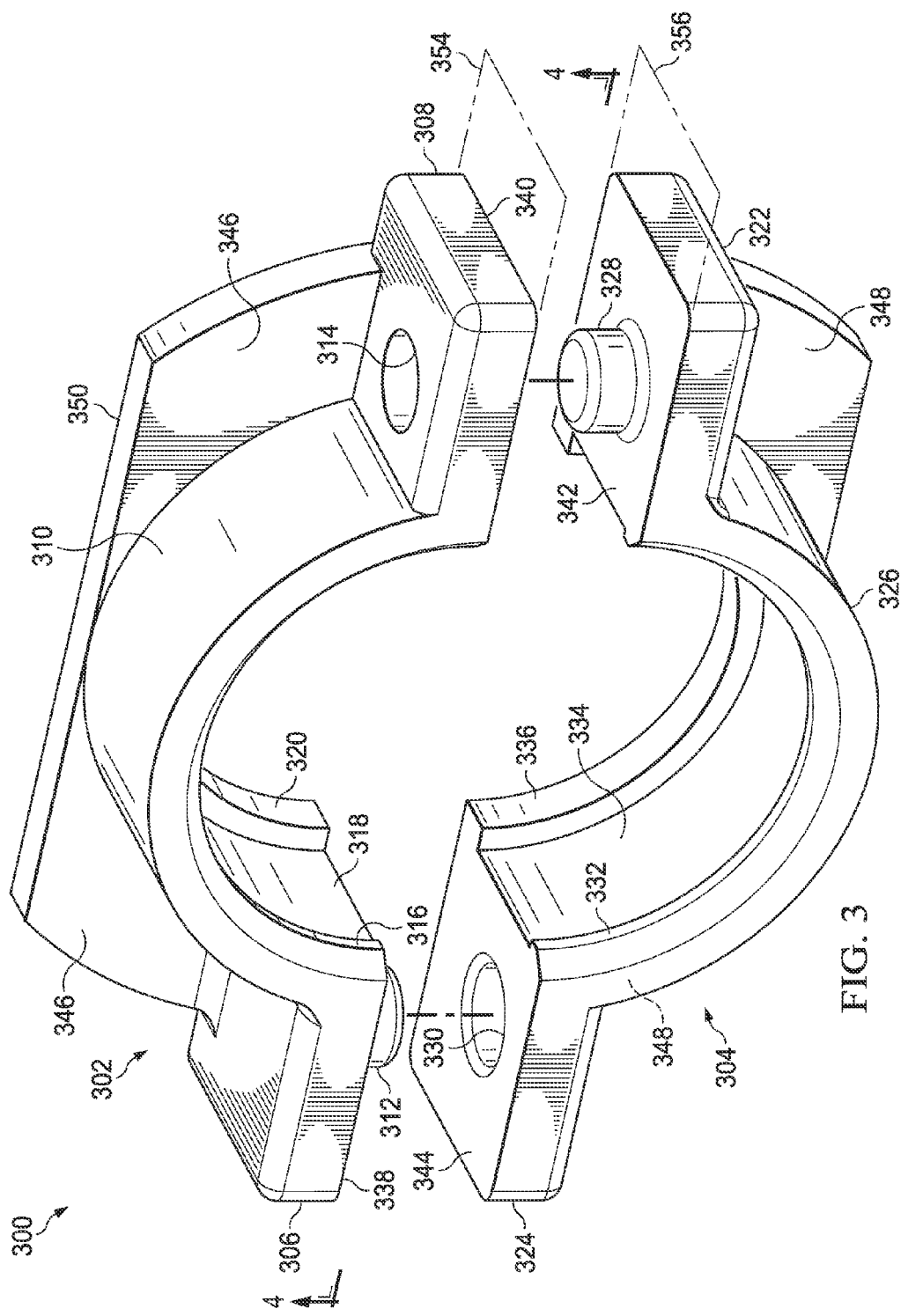
FIG. 3 is an illustration, in an isometric view, of a first section and a second section, separated, of an apparatus configured to fit a sleeve over a first tube and a second tube, in accordance with an advantageous embodiment.

With reference now to FIG. 3, FIG. 3 is an illustration, in an isometric view, of a first section and a second section, separated, of an apparatus configured to fit a sleeve over a first tube and a second tube, in accordance with an advantageous embodiment. More specifically, FIG. 3 illustrates unassembled spreine 300.

Unassembled spreine 300 may be an illustration of an embodiment of unassembled spreine 100 as shown in FIG. 1. Unassembled spreine 300 may be an apparatus that may include first section 302 and second section 304. First section 302 and second section 304 may be illustrations of implementations for first section 102 and second section 304, respectively, in FIG. 1. First section 302 may include: first extension 306, second extension 308, arch 310, and slider 346.

First extension 306 may include nub 312. Second extension 308 may contain slot 314. First extension 306 may be a protrusion from a portion of the circumference of arch 310. First extension 306 may protrude along an entire axial length of arch 310. First extension 306 may be shaped as a rectangular prism. First extension 306 may be oriented substantially orthogonally to a plane that may be substantially tangent to a circumference of arch 310. First extension 306 may have first joint face 338 that may be flush and contiguous with an annular width of arch 310.

Second extension 308 may be a protrusion from a portion of the circumference of arch 310. Second extension 308 may protrude along an entire axial length of arch 310. Second extension 308 may be shaped as a rectangular prism. Second extension 308 may be oriented substantially orthogonally to a plane that may be substantially tangent to a circumference of arch 310. Second extension 308 may have second joint face 340 that is flush and continuous with the annular width of arch 310. First joint face 338 and second joint face 340 may each share a plane with planar diameter 354 of arch 310.

Arch 310 may include: starter ridge 316, interior face 318, and stopper ridge 320. Starter ridge 316 and stopper ridge 320 may each be substantially concentric with and contiguous to interior face 318 of arch 310.

Slider 346 may be a flange type extension from arch 310. Slider 346 may extend radially outward from a circumference of arch 310. Slider 346 may have straight face 350 that may be substantially parallel to planar diameter 354 of arch 310. Thus, straight face 350 of slider 346 may be substantially parallel to first joint face 338 and second joint face 340. Slider 346 may be rigid.

Stopper ridge 320 may be an extension from arch 310. Stopper ridge 320 may be a ring that may extend inwardly from interior face 318 toward a central axis of arch 310 along an interior radius of arch 310 for a full arc of arch 310.

Interior face 318 may appear as a circumferential indentation in arch 310. Interior face 334 may appear as a circumferential indentation in arch 326.

Second section 304 may include: first extension 322, second extension 324, arch 326, and slider 348. Second section 304 may have a substantially identical form and be formed of a substantially identical material as first section 302. First section 302 and second section 304 may be formed from: a rubber, a plastic, a composition, a metal, an alloy, any materials suited to the function of unassembled spreine 300, or any combination thereof. Second section 304 may have a substantially identical form and be formed of materials that vary from first section 302.

First extension 322 may include nub 328. Second extension 324 may contain slot 330. First extension 322 may be a protrusion from a portion of the circumference of arch 326. First extension 322 may protrude along an entire axial length of arch 326. First extension 322 may be shaped as a rectangular prism. First extension 322 may be oriented substantially orthogonally to a plane that may be substantially tangent to a circumference of arch 326. First extension 322 may have second joint face 344 that is flush and continuous with an annular width of arch 326.

Second extension 324 may be a protrusion from a portion of the circumference of arch 326. Second extension 324 may protrude along an entire axial length of arch 326. Second extension 324 may be shaped as a rectangular prism. Second extension 324 may be oriented substantially orthogonally to a plane that may be substantially tangent to a circumference of arch 326. Second extension 324 may have second joint face 344 that is flush and continuous with an annular width of arch 326. Second joint face 344 and first joint face 342 may each share planar diameter 356 of arch 326.

Arch 326 may include: starter ridge 332, interior face 334, and stopper ridge 336. Starter ridge 332 and stopper ridge 336 may each be substantially concentric with and contiguous to interior face 334 of arch 326.

Slider 348 may be a flange type extension from arch 326. Slider 348 may extend radially outward from a circumference of arch 326, having a planar face that may be substantially parallel to the plane of the extended diameter of arch 326. Thus, the planar face of slider 348 may be substantially parallel to second joint face 344 and first joint face 342. Slider 348 may be rigid.

Stopper ridge 336 may be an extension from arch 326 that extends inwardly toward a central axis of arch 326 along an interior radius of arch 326 for a full arc of arch 326.

Interior face 318 may be a circular recession in arch 310. Interior face 334 may be a circular recession in arch 326.

First section 302 may connect to second section 304. First section 302 may connect to second section 304 by first extension 306 connecting to second extension 324, and first extension 322 connecting to second extension 308. Nub 312 of first extension 306 of first section 302 may be of a size and a shape that may insert into slot 330 of second extension 324 of second section 304.

Nub 312 may be retained by slot 330. Without limitation, nub 312 may be a protrusion from first extension 306, and slot 330 may be an indentation in second extension 324. Nub 312 may be a cylindrical protrusion with a first diameter. Slot 330 may be a cylindrical indentation with a second diameter. The second diameter may be greater than the first diameter such that slot 330 may receive nub 312. The second diameter may be configured such that slot 330 may maintain a frictional retention of nub 312. Nub 312 may be a protrusion shaped other than cylindrically. Slot 330 may be any shape that may conform to shape of nub 312.

First section 302 and second section 304 may be a substantially identical size and a substantially identical shape to each other. First extension 322 may connect to second extension 308. Nub 328 of first extension 322 of second section 304 may be of a size and a shape that may insert into slot 314 of second extension 308 of first section 302.

Nub 328 may be retained by slot 314. Without limitation, nub 328 may be a protrusion from first extension 322, and slot 314 may be an indentation in second extension 308. Nub 328 may be a cylindrical protrusion with a first diameter. Slot 314 may be a cylindrical indentation with a second diameter. The second diameter may be greater than the first diameter such that slot 314 may receive nub 328. The second diameter may be configured such that slot 314 may maintain a frictional retention of nub 328. Nub 328 may be a protrusion shaped other than cylindrically. Slot 314 may be any shape that may conform to shape of nub 328.

Figure 4:
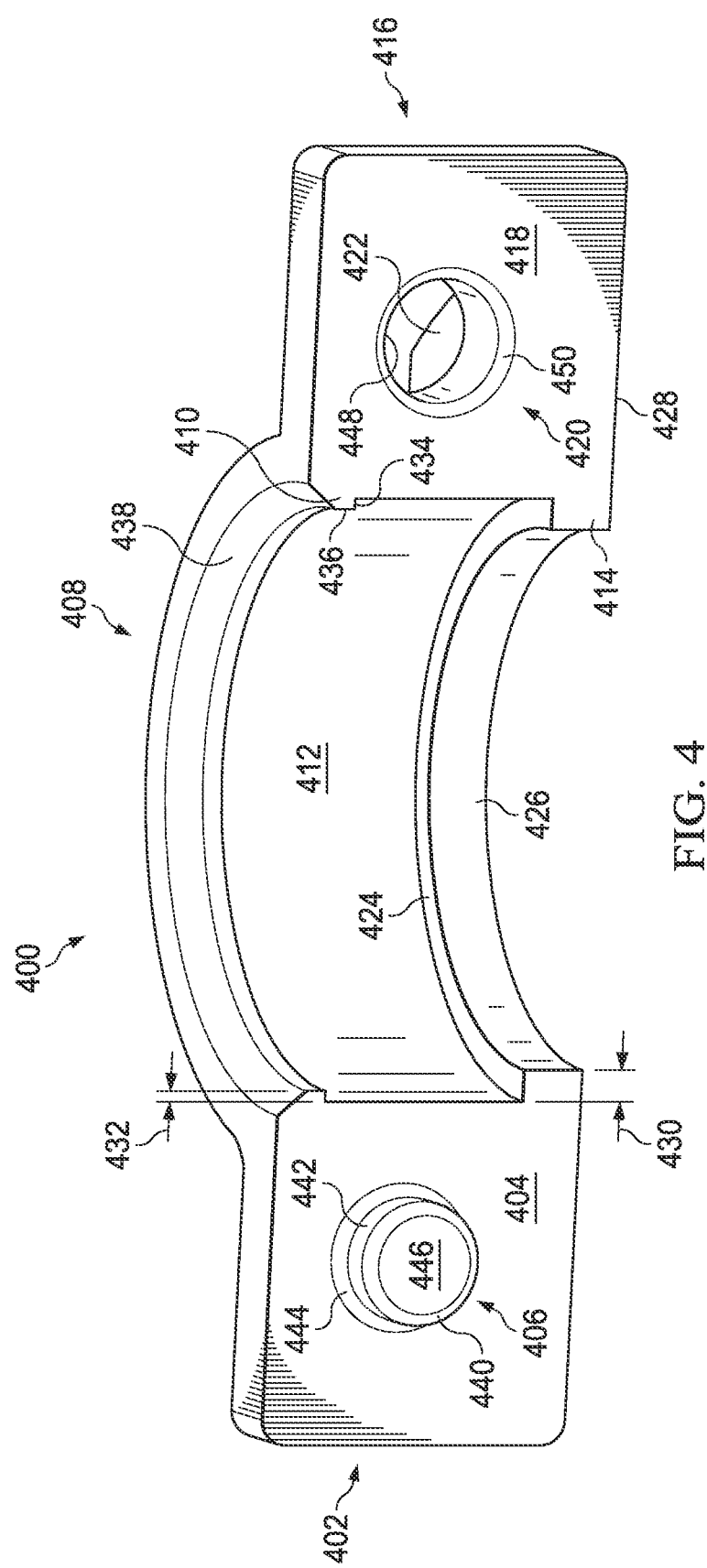
FIG. 4 is an illustration, in an isometric view, of a section of an apparatus, in accordance with an advantageous embodiment.

With reference now to FIG. 4, FIG. 4 is an illustration, in an isometric view, of a section of an apparatus, in accordance with an advantageous embodiment. More specifically, first section 400 shows an isometric view of first section 302 of FIG. 3 along view line 4-4 shown in FIG. 3.

First section 400 may include first extension 402, first joint face 404, nub 406, arch 408, starter ridge 410, interior face 412, stopper ridge 414, second extension 416, second joint face 418, slot 420, and slider 422. First joint face 404 may share a plane with second joint face 418, and a planar diameter of arch 408.

Stopper ridge 414 may include forward face 424, idle face 426, and tail face tail face 428. Idle face 426 may be substantially concentric with interior face 412. Stopper ridge 414 may have height 430.

Height 430 may be a radial distance from, an edge between interior face 412 and forward face 424, to an edge between forward face 424 and idle face 426. Height 430 may be greater that a thickness of a sleeve that may engage first section 400.

Starter ridge 410 may include aft face 434, axial face 436, and beveled face 438. Starter ridge 410 may have height 432. Height 432 may be a radial distance from an edge between interior face 412 and aft face 434, to an edge between aft face 434 and axial face 436. Height 432 may be greater than the thickness of the sleeve that may engage first section 400.

Nub 406 may include tapered face 440, axial face 442, tapered face 444, and top face 446. Tapered face 440 and 444 may each have a shape that may be frustoconical. Tapered face 440 may facilitate nub 406 entering slot 330 of second section 304, of FIG. 3. Tapered face 444 may facilitate nub 406 engaging with slot 330. Slot 330 may be shaped substantially identical to slot 420.

Slot 420 may include interior face 448 and countersink 450. Countersink 450 may facilitate slot 420 receiving nub 328 from second section 304, of FIG. 3.

Figure 5:
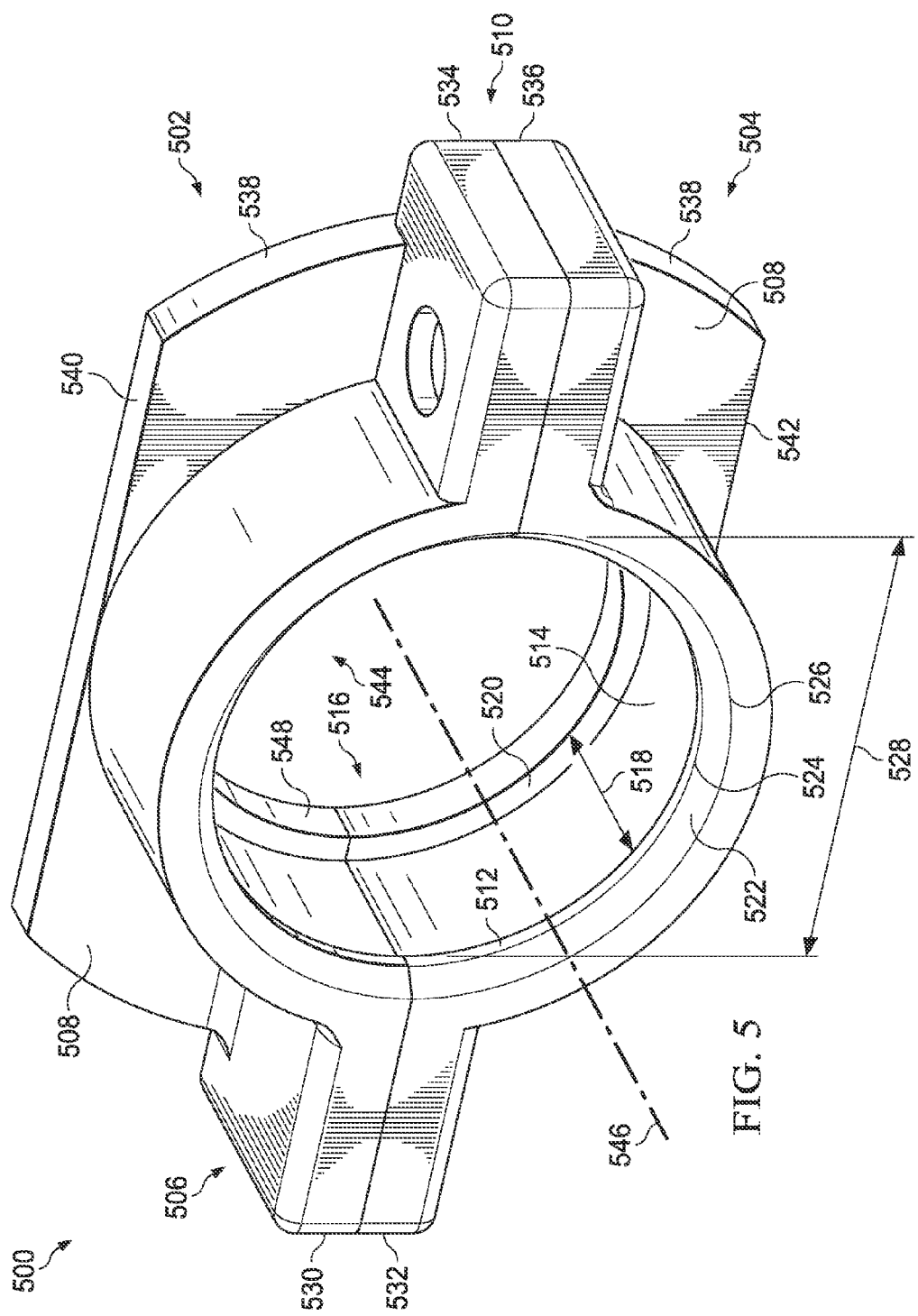
FIG. 5 is an illustration, in an isometric view, of a first section of a spreine, connected to a second section of a spreine in accordance with an advantageous embodiment.

With reference to FIG. 5, FIG. 5 is an illustration, in an isometric view, of a first section of a spreine, connected to a second section of a spreine in accordance with an advantageous embodiment. More specifically, spreine 500 may be an illustration of an embodiment of spreine 200 as shown in FIG. 2.

Spreine 500 may include first section 502 connected to second section 504, forming first grip 506, slider 508, second grip 510, and barrel 544. Barrel 544 may include starter rim 512, chamber 514, and stopper rim 516. Starter rim 512 chamber 514, and stopper rim 516 may all be substantially concentric about central axis 546 of barrel 544.

First grip 506 may be formed when first extension 530 of first section 502 may be connected to second extension 532 of second section 504. First extension 530 of second section 504 may be friction fit into second extension 532 of first section 502, or may be removably connected to second extension 532 in any of a number of other effective manners.

Second grip 510 may be formed when second extension 534 of first section 502 may be connected to first extension 536 of second section 504. First extension 536 may be friction fit into second extension 534 of first section 502, or may be removably connected to second extension 534 in any of a number of other effective manners.

Chamber 514 may be formed when first section 502 may be connected to second section 504. Chamber 514 may be substantially concentric with and lie between starter rim 512 and stopper rim 516.

Spreine 500 is shown without a sleeve in chamber 514. In use, a sleeve may be engaged with first section 502 before second section 504 is connected to first section 502 and encircles the sleeve within chamber 514.

Stopper rim 516 may have forward face 520, idle face 548, and a trailing face (not visible). Starter rim 512 may include beveled face 522. Beveled face 522 may have inner edge 524 and outer edge 526.

Chamber 514 may include diameter 528. Diameter 528 may be sized such that all of the circumferential face of the sleeve may contact chamber 514. Thus, spreine 500 may be sized such that the sleeve may nest in chamber 514 between starter rim 512 and stopper rim 516, as will be shown in FIG. 6B.

Slider 508 may include radial face 538, a tail face (not visible), straight face 540, and straight face 542 (only edge of face is visible in FIG. 5). Slider 508 may be formed when first slider 346 may be aligned and abutted with second slider 348, as shown in FIG. 3, when first section 502 may be connected to second section 504. Straight face 540 may be in a plane that is substantially parallel to diameter 528 of chamber 514.

Each straight face may be substantially tangent to a circumference of barrel 544. Substantially tangent orientation of each straight face of slider 508 may minimize profile of slider 508 and of spreine 500. Minimizing profile of slider 508 and of spreine 500 may minimize interference and/or contact with other equipment located near the first tube and the second tube.

Slider 508 may provide a surface that may receive a force that may move spreine 500. Slider 508 may be connected to stopper rim 516. Slider 508 may be contiguous with stopper rim 516. Slider 508 may be of same material as stopper rim 516. Slider 508 may be rigid. Slider 508 may be formed of a material that may have a different rigidity than a remainder of spreine 500. Slider 508 may have a first rigidity that may be substantially identical to or significantly different from a second rigidity of the remainder of spreine 500.

The first rigidity of slider 508 and the second rigidity of the remainder of spreine 500 may allow a force applied to slider 508 to transfer through spreine 500 and to the particular sleeve that may be encircled by spreine 500 and engaged in chamber 514 between starter rim 512 and stopper rim 516. Slider 508 may thus receive a force that may move the particular sleeve over the first O-ring and the second O-ring without displacing either O-ring from their respective groove in their respective ferrule.

In use, once the particular sleeve is fitted over each O-ring, spreine 500 may be removed from the particular sleeve by disconnecting first section 502 from second section 504.

With reference now to FIG. 6, FIG. 6 is an illustration, in an isometric view, of fitting a first tube to a second tube, using an apparatus to move a sleeve encircling the first tube to fit the first tube to the second tube, in accordance with an advantageous embodiment. FIG. 6 is presented as FIG. 6A through FIG. 6F; FIG. 6A is an illustration, in an isometric view, of a first tube and a second tube, with a sleeve encircling the first tube, in accordance with an advantageous embodiment; FIG. 6B is an illustration, in an isometric view, of a first section of a spreine apparatus engaged with a sleeve before fitting a first tube to a second tube, in accordance with an advantageous embodiment; FIG. 6C is an illustration, in an isometric view, of a spreine just prior to a beveled face of the spreine contacting an O-ring of a first tube; FIG. 6D is an illustration, in an isometric view, of a spreine after fitting a first tube to a second tube using a sleeve, with a first section of the spreine joined to a second section of the spreine, encircling the sleeve, in accordance with an advantageous embodiment; FIG. 6E is an illustration, in an isometric view, of a sleeve fitting a first tube to a second tube, with a first section of a spreine engaged with the sleeve, in accordance with an advantageous embodiment;

FIG. 6F is an illustration, in an isometric view, of a sleeve fitting a first tube to a second tube, with a first section of a spreine engaged with the sleeve presented in cutaway to afford a view of the sleeve contact with O-rings, in accordance with an advantageous embodiment.

With reference now to FIG. 6A, FIG. 6A is an illustration, in an isometric view, of a first tube and a second tube, with a sleeve encircling the first tube, in accordance with an advantageous embodiment. More specifically, FIG. 6A shows first tube 602, which may include first ferrule 604, which may include first O-ring 606, and second tube 608, which may include second ferrule 610, which may include second O-ring 612. Sleeve 614 may encircle first tube 602.

Each O-ring may have a respective circumference that may be greater than a circumference of a respective ferrule upon which each O-ring may be engaged. Accordingly, first ferrule 604 may have first collar 616 and first retainer 618. First collar 616 may extend radially from a first end 620 of first tube 602. A groove may exist between first collar 616 and first retainer 618 that is sized to retain first O-ring 606. A circumference of first retainer 618 and first collar 616 each may be smaller than a circumference of first O-ring 606. As discussed further with FIG. 7, a radius to an outer face 622 of first retainer 618 may be less than a radius to an interior face of sleeve 614.

FIG. 6A shows a configuration of first tube 602 and second tube 608 before encircling sleeve 614 within first section 624, as shown in FIG. 6B. FIG. 6A may illustrate sleeve 614 before sleeve 614 may be moved to the left and engage first O-ring 606 and second O-ring 612 and fit first tube 602 to second tube 608. First ferrule 604 and second ferrule 610 may be axially aligned to facilitate fitting first tube 602 to second tube 608 via sleeve 614.

Sleeve 614 may be placed around first tube before first O-ring 606 is inserted into first ferrule 604. Encircling first tube 602 with sleeve 614 before inserting first O-ring 606 into the groove in first ferrule 604 may expedite encircling first tube 602 with sleeve 614. Encircling first tube 602 with sleeve 614 before inserting first O-ring 606 into the groove in first ferrule 604 may minimize potential damage to first O-ring 606 and any adjacent equipment as sleeve 614 may be placed to encircle first tube 602.

Currently, without the use of an apparatus such as spreine 626, as shown in FIG. 6C, to move sleeve 614, attempts to move sleeve 614 may result in damaging an O-ring or displacing an O-ring from a ferrule. Currently, without the use of an apparatus such as spreine 626, as shown in FIG. 6C, to move sleeve 614, attempts to move sleeve 614 may result in damage to a tube or to equipment adjacent to first tube 602 or second tube 608. Further, attempts to move sleeve 614 without using spreine 626, as shown in FIG. 6C, may result in sleeve 614 becoming skewed so that it is not substantially concentric with first ferrule 604 and/or second ferrule 610.

Non-substantially concentric alignment of sleeve 614 with first ferrule 604 and/or second ferrule 610 may result in a failure of sleeve 614 to form a leak resistant seal with first O-ring 606 and/or second O-ring 612. A leak resistant seal may be formed when first O-ring 606 and second O-ring 612 each contact an interior face of sleeve 614 about a complete circumference of each respective O-ring. First O-ring 606 and second O-ring 612 may each contact the interior face of sleeve 614 along a complete circumference of each respective O-ring when each O-ring and sleeve 614 are axially aligned, and substantially concentric with, each other.

Failure of sleeve 614 to form a leak resistant seal with first O-ring 606 and/or second O-ring 612 may require removing sleeve 614 from first O-ring 606 and/or second O-ring 612 and starting the process of fitting first tube 602 to second tube 608 once again.

Axially aligning first end 620 with second end 642 of second tube 608 may facilitate moving sleeve 614 over first O-ring 606 and second O-ring 612 to fit first tube 602 to second tube 608.

Attempts to remove sleeve 614 from encircling first O-ring 606 and/or second O-ring 612 may result in damaging an O-ring or displacing an O-ring from a ferrule. Attempts to remove sleeve 614 may result in damage to a tube or to equipment adjacent to first tube 602 or second tube 608.

In some embodiments first tube 602 and second tube 608 may each be a fuel line. Fuel lines may be located in a vehicle. The vehicle may be an aircraft. Each fuel line may be held in a bracket. Fitting the first fuel line to the second fuel line may require that one or both fuel lines be removed from their respective bracket in order to place the sleeve around the first fuel line.

With reference to FIG. 6B, FIG. 6B is an illustration, an isometric view, of a first section of a spreine apparatus engaged with a sleeve before fitting a first tube to a second tube, in accordance with an advantageous embodiment. More specifically, FIG. 6B shows all the items shown in FIG. 6A with the addition of first section 624 being engaged with sleeve 614 such that sleeve 614 may engage with an inner face of sleeve 614, starter ridge 628, and stopper ridge 630. First section 624 may be an example of first section 102 as shown in FIG. 1, or 502 as shown in FIG. 5, in accordance with an illustrative embodiment. The inner face of sleeve 614 may be interior face 118, as shown in FIG. 1. Sleeve 614 may include trailing face 632 and leading face 634.

Starter ridge 628 may include beveled face 636. Beveled face 636 may be an illustration of an embodiment of beveled face 438, as shown in FIG. 4. Beveled face 636 may be lubricated. Beveled face 636 being lubricated may facilitate passing starter ridge 628 and sleeve 614 across first O-ring 606 and second O-ring 612 without displacing either O-ring from their respective ferrule. Beveled face 636 may be shaped at an angle and/or of a material with a friction coefficient that may preclude displacing either O-ring from either ferrule as starter ridge 628 passes over either O-ring.

With reference now to FIG. 6C, FIG. 6C is an illustration, in an isometric view, of a spreine just prior to a beveled face of the spreine contacting an O-ring of a first tube. More specifically, spreine 626 is shown with first section 624 connected to second section 638 as force 648 may be moving spreine 626 to engage first O-ring 606 with beveled face 636. Second section 638 may be an example of second section 104 as in FIG. 1 or second section 504 as in FIG. 5, in accordance with an illustrative embodiment.

Spreine 626 may receive force 648 on first grip 644, second grip 646, and/or slider 640. Force 648 may be a pushing and/or a tugging force, being applied to slider 640, first grip 644, and/or to second grip 646 such that spreine 626 may pass over first ferrule 604 without displacing or damaging first O-ring 606.

Spreine 626 may encircle sleeve 614. Slider 640, first grip 644, and/or second grip 646 may be used to move spreine 626 and sleeve 614 from a first position shown in FIG. 6B to a second position shown for spreine 626 and sleeve 614 in FIG. 6C. Slider 640 may be an illustration of an embodiment of slider 508 as shown in FIG. 5. A first rigidity of slider 640 and a second rigidity of a remainder of spreine 626 may allow a force applied to slider 640 to transfer through spreine 626 and to sleeve 614. Not visible in FIG. 6C may be forward face 520, of stopper rim 516 as visible in FIG. 5, contacting trailing face 632 of sleeve 614. Forward face 520 of stopper rim 516 may transfer force applied to slider 640 to trailing face 632 of sleeve 614. Slider 640 may thus receive force 648 that may move sleeve 614 across first O-ring 606 and second O-ring 612 without displacing either O-ring from their respective groove in their respective ferrule.

Similarly, first grip 644 and/or second grip 646 may be used to move spreine 626 and sleeve 614 from a first position shown in FIG. 6B to a second position shown for spreine 626 and sleeve 614 in FIG. 6C. First grip 644 and second grip 646 may be respective illustrations of an embodiment of first grip 506 and second grip 510 as shown in FIG. 5, or of first grip 404 and second grip 406 as shown in FIG. 4. A third rigidity of first grip 644 and or a fourth rigidity of second grip 646, and a second rigidity of a remainder of spreine 626 may allow a force applied to first grip 644 and/or second grip 646 to transfer through spreine 626 and to sleeve 614. First grip 644 and/or second grip 646 may thus receive a force that may move sleeve 614 across first O-ring 606 and second O-ring 612 without displacing either O-ring from their respective groove in their respective ferrule.

As will be further shown in FIG. 7, a radius to an outer face of first retainer 618 maybe greater than a radius to idle face 548 of stopper rim 516, as shown in FIG. 5. Thus, forward face 520, of stopper rim 516 may contact first retainer 618 and stop motion of spreine 626. Stopping motion of spreine 626 may stop sleeve 614 in a position with sleeve 614 engaged with first O-ring 606 and second O-ring second O-ring 612. Contact of forward face 520, of stopper rim 516 with first retainer 618 may restrict sleeve 614 from overshooting first O-ring first O-ring 606, disengaging from first O-ring 606, and breaking seal between first O-ring 606 and sleeve 614.

Thus, by using spreine 626 and applying force 648 onto slider 640 and/or first grip 644, and/or second grip 646, sleeve 614 may be moved to fit first tube 602 to first ferrule 604 in less than 4 minutes. Using spreine 626 may also preclude any damage to components adjacent to first tube 602 and/or second tube 608. Force 648 required to move spreine 626 and sleeve 614 within spreine 626 may be applied to 640 slider 640 and/or first grip 644, and/or second grip 646 manually by a technician without a need for using any other tools or force implements.

Beveled face 636 may be lubricated to facilitate passing starter rim 512, as shown in FIG. 5, and sleeve 614 across first O-ring 606 and second O-ring 612 without damaging and/or displacing either O-ring from their respective ferrule. Beveled face 636 may be shaped at an angle and/or of a material with a friction coefficient that may preclude damaging and/or displacing either O-ring from either ferrule as starter ridge 628 passes over either O-ring.

With reference to FIG. 6D, FIG. 6D is an illustration, in an isometric view, of a spreine after fitting a first tube to a second tube using a sleeve, with a first section of the spreine joined to a second section of the spreine, encircling the sleeve, in accordance with an advantageous embodiment. FIG. 6D shows spreine 626 after spreine 626 may have moved sleeve 614 to engage with first O-ring 606 and second O-ring second O-ring 612. Moving sleeve 614 to engage with first O-ring 606 and second O-ring 612 may fit first tube 602 to second tube 608.

With reference now to FIG. 6E, FIG. 6E is an illustration, in an isometric view, of a sleeve fitting a first tube to a second tube, with a first section of a spreine engaged with the sleeve, in accordance with an advantageous embodiment. More specifically, FIG. 6E shows sleeve 614 engaged with first O-ring 606 and second O-ring 612 (both O-rings under sleeve 614 and not visible), fitting first tube 602 to second tube 608. FIG. 6E shows first section 624 still engaged with sleeve 614 after second section 638 is disengaged from first section 624 and sleeve 614. With sleeve 614 fitting first tube 602 to second tube 608, first section 624 of spreine 626 may also be disengaged from sleeve 614.

With reference now to FIG. 6F, FIG. 6F is an illustration, in an isometric view, of a sleeve fitting a first tube to a second tube, with a first section of a spreine engaged with the sleeve presented in cutaway to afford a view of the sleeve contact with O-rings, in accordance with an advantageous embodiment. More specifically, FIG. 6F shows elements of FIG. 6D, with a portion of sleeve 614 cut away so that alignment of sleeve 614 over first O-ring 606 and second O-ring 612 may be seen as they would be seated when sleeve 614 is fitted in place to couple first tube 602 to second tube 608.

Stopper ridge 630 of spreine 626 may also be seen in contact with first retainer 618. Thus, spreine is shown having facilitated: stopping sleeve 614 before sleeve 614 may move off of contact with first O-ring 606, which may substantially center sleeve 614 over abutment of first tube 602 to second tube 608, and without damaging or displacing either O-ring, such that sleeve 614 compresses against first O-ring 606 and second O-ring second O-ring 612, formed a seal that may fit first tube 602 to second tube 608. With sleeve 614 fitting first tube 602 to second tube 608, first section 624 may be disengaged from sleeve 614. Sleeve 614 may then be further secured to inhibit breaking a seal formed between sleeve 614 and first O-ring 606 and second O-ring 612 that fits first tube 602 to second tube 608. Without limitation, a clamp or trademarked Wiggins coupling may be secured around sleeve 614. Other means of inhibiting any further movement of sleeve 614 may be applied. Without limitation, a tape or a sealant may be applied over sleeve 614.

With reference now to FIG. 7, FIG. 7 is an illustration, in an isometric view, of a tube with a ferrule and an O-ring, a sleeve, and a spreine aligned to illustrate their proportions and features relative to each other.

More specifically, tube 700 is shown with a portion of tube 700 cutaway. The cutaway portion of tube 700 would be encircled by sleeve 702 before assembling first section 704 of spreine 708 and second section 706 of spreine 708 around sleeve 702 and moving sleeve 702 over O-ring 710 in tube 700, as shown in FIGS. 6A-6F.

Tube 700 may include O-ring 710 in ferrule 712, central axis 724, radius 754, exterior face 756, and radius 758. Tube 700, O-ring 710, and ferrule 712 may be examples of first tube 602, first O-ring 606, and first ferrule 604 first presented in FIG. 6A, in accordance with an illustrative embodiment.

Sleeve 702 may be an example of sleeve 614 of FIG. 6A, in accordance with an illustrative embodiment. Sleeve 702 may include: central axis 724, radius 726, inner surface 728, aft annular face 732, forward annular face 734, exterior face 740, and radius 746.

Spreine 708 may be an example of spreine 200 of FIG. 2, spreine 500 of FIG. 5, or spreine 626 of FIG. 6C, in accordance with an illustrative embodiment. Spreine 708 may include: first section 704, second section 706, chamber 714, stopper rim 716, central axis 724, and starter rim 738.

Spreine 708 is shown without sleeve 702 in chamber 714. In use, sleeve 702 may be engaged with first section 704 before second section 706 is connected to first section 704 and encircles sleeve 702 within chamber 714. Sleeve 702 is shown separate from spreine 708 to enhance visibility of spreine 708 features.

Stopper rim 716 may include: forward face 718, idle face 720, and a trailing face (not visible). Radius 722 from central axis 724 to idle face 720 may be less than radius 726 to inner surface 728 of sleeve 702. Thus when sleeve 702 may be engaged in chamber 714, a portion of forward face 718 may be visible from within sleeve 702. Furthermore, a tube that may pass through sleeve 702 may not be able to pass through stopper rim 716.

Spreine 708 may be sized based upon a size of sleeve 702, such that length 730 of chamber 714, which is a distance from forward face 718 to an aft face 736 of starter rim 738, may allow: aft annular face 732 of sleeve 702 to contact forward face 718 of stopper rim 716, and forward annular face 734 of sleeve 702 to contact aft face 736 of starter rim 738. Exterior face 740 of sleeve 702 may contact interior face 742 of chamber 714. Radius 744 from central axis 724 to interior face 742 of chamber 714 may be substantially equal to radius 746 of exterior face 740 of sleeve 702.

Starter rim 738 may include beveled face 746. Beveled face 746 may have inner edge 748 and outer edge 750. Radius 752 from central axis 724 to inner edge 748 may be less than radius 726 from central axis 724 to inner surface 728 of sleeve 702. Thus, when sleeve 702 may be engaged in chamber 714, a tube that may pass through inner edge 748 of starter rim 738, may pass through sleeve 702 as well. Radius 752 from central axis 724 to inner edge 748 may be greater than a radius 754 from central axis 724 to exterior face 756 of ferrule 712 in tube 700. Thus, starter rim 738 may pass over a circumference of ferrule 712. Tube 700 and ferrule 712 may be illustrative embodiments of first tube 602 and first ferrule 604 of FIG. 6A. Radius 758 from central axis 724 to outer edge 750 may be greater than a radius 760 from central axis 724 to an exterior edge of O-ring 710 in tube 700.

Because the elements and sizes of components of any tube that may be coupled with tube 700 using sleeve 702 and spreine 708 are substantially identical to those represented in the illustration for tube 700, the relationship between spreine 708 and/or sleeve 702 and any tube that may be coupled with tube 700 may be substantially identical to those illustrated in FIG. 7 and described above for the relationship between tube 700 and/or sleeve 702 and spreine 708.

The different components shown in FIGS. 3-7 may be illustrative examples of how components shown in block form in FIGS. 1-2 and 8-11 can be implemented as physical structures. Additionally, some of the components in FIGS. 3-7 may be combined with components in FIGS. 1-2 and 8-11, used with components in FIGS. 1-2 and 8-11, or a combination of the two.

With reference now to FIG. 8, FIG. 8 is an illustration, as a flowchart, of a process for connecting a first tube to a second tube, in accordance with an advantageous embodiment. More specifically, process 800 shows operations 802 through 810 for fitting first tube 602 to second tube 608 using spreine 626, as shown in FIGS. 6A through 6F.

Process 800 may begin with encircling, with spreine 626, sleeve 614 encircling first tube 602, by connecting first section 624 of spreine 626 to second section 638 of spreine 626 (operation 802). Process 800 may include aligning first tube 602 with second tube 608 (operation 804).

Process 800 may include moving spreine 626 such that sleeve 614 encircles first tube 602 and second tube 608 (operation 806). Process 800 may include removing spreine 626 (operation 808). Process 800 may conclude with clamping sleeve 614 to first tube 602 and second tube 608, via a clamp around sleeve 614 (operation 810). Without limitation, the clamp may be a trademarked Wiggins coupling, or any other means known in the art that may inhibit movement of sleeve 614 from fitting first tube 602 to second tube 608.

With reference now to FIG. 9, FIG. 9 is an illustration, as a flowchart, of a process for fitting a sleeve about a first end of a first tube and a second end of a second tube, in accordance with an advantageous embodiment. More specifically, process 900 shows operations 902 through 916 for fitting sleeve 614 about first end 620 of first tube 602 and second end 642 of second tube 608, as shown in FIGS. 6A through 6F.

Process 900 may begin by encircling first tube 602 with sleeve 614, such that leading face 634 of sleeve 614 and trailing face 632 of sleeve 614 each fully encircle a portion of first tube 602, trailing face 632 being farther from first end 620 than leading face 634 (operation 902). Process 900 may include engaging sleeve 614 with first section 624 of spreine 626 (operation 904).

Process 900 may include engaging sleeve 614 and first section 624 with second section 638 of spreine 626 (operation 906). Engaging sleeve 614 may include locating leading face 634 of sleeve 614 within chamber 410 of spreine 626. Engaging may include chamber 714 existing between starter rim 738 and stopper rim 716. Starter rim 738 may include beveled face 746. Beveled face 746 may include: radius 742 from central axis 724 to inner edge 748 of beveled face 746 being less than radius 726 from central axis 724 to interior face 728 of sleeve 702, and an increasing radius from central axis 724 to beveled face 746 when moving axially along beveled face 746 from inner edge 748 to outer edge 750, such that radius 758 from central axis 724 to outer edge 750 may be greater than radius 744 from central axis 724 to interior face 742 of chamber 714 in barrel 202.

Process 900 may include forming, via engaging first section 624 with second section 638, first grip 644 of spreine 626 and second grip 646 of spreine 626 (operation 908). Engaging first section 624 with second section 638 may include first section 624 and second section 638 being shaped substantially identical, and nub 328 on first extension 322 of second section 638 engaging slot 314 in second extension 308 of first section 624, forming first grip 644, and nub 312 on first extension 306 of first section 624 engaging slot 330 in second extension 324 of second section 638, forming second grip 646.

Process 900 may include aligning first end 620 with second end 642 (operation 910). Aligning may include axially aligning first end 620 with second end 642. A distance from first end 620 to the second end 642 may be less than a length of sleeve 614. First end 620 may include first ferrule 604 and second end 642 may second ferrule 610.

Process 900 may include fitting, using spreine 626, first tube 602 to second tube 608, via sleeve 614 (operation 912). Fitting may include first ferrule 604 retaining first O-ring 606 and second ferrule 610 retaining second O-ring 612. Fitting may include moving spreine 626 toward second tube 608 such that leading face 634 encircles second tube 608 and trailing face 632 encircles first tube 602. Moving may include spreine 626 receiving a force on at least one of: first grip 644, second grip 646, and slider 640. Moving may include trailing face 632 receiving force through contact with stopper rim 208. Moving may include stopping spreine 626 from moving trailing face 632 of sleeve 614 off first O-ring 606 by contacting forward face 216 of stopper rim 208 against first retainer 618 of first ferrule 604.

Process 900 may include removing spreine 626 from sleeve 614 (operation 914); and clamping sleeve 614 to first tube 602 and second tube 608, via a clamp around sleeve 614 (operation 916). Clamp around sleeve 614 may be any appropriate coupling. Without limitation, a trademarked Wiggins coupling may be used to clamp sleeve 614.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. Without limitation, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

FIG. 10 and FIG. 11, illustrate embodiments of the disclosure that may be described in the context of aircraft manufacturing and service method 1000 as shown in FIG. 10 and aircraft 1100 as shown in FIG. 11. Turning first to FIG. 10, FIG. 10 is an illustration of an aircraft manufacturing and service method in accordance with an advantageous embodiment. During preproduction, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 may take place. Component and subassembly manufacturing 1006 may include fitting tubes together. Without limitation, fitting tubes together during component and subassembly manufacturing 1006 may include coupling fuel, hydraulic, pneumatic, or electrical tubes, lines, or conduit together.

Similarly, system integration 1008 of aircraft 1100 in FIG. 11 may include fitting tubes together. Without limitation, system integration 1008 may include coupling fuel, hydraulic, pneumatic, or electrical tubes, lines, or conduit together.

Thereafter, aircraft 1100 in FIG. 11 may go through certification and delivery 1010 in order to be placed in service 1012. While in service 1012 by a customer, aircraft 1100 in FIG. 11 may be scheduled for routine maintenance and service 1014, which may include modification, reconfiguration, refurbishment, and other maintenance or service. Without limitation, routine maintenance and service 1014 may include using spreine 200 to fit together tubes, tunnels, pipes, lines, and/or conduits of any system on aircraft 1100, which may include without limitation propulsion system 1108, electrical system 1110, hydraulic system 1112, environmental system 1114, and computer system 1116 as shown in FIG. 11. Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 11, FIG. 11 is an illustration of an aircraft in which an advantageous embodiment may be implemented. In this example, aircraft 1100 may be produced by aircraft manufacturing and service method 1000 in FIG. 10 and may include airframe 1102 with a plurality of systems 1104 and interior 1106. Without limitation, systems 1104 may include one or more of propulsion system 1108, electrical system 1110, hydraulic system 1112, environmental system 1114, and computer system 1116. Any number of other systems may be included. Although an aerospace example is shown, different advantageous embodiments may be applied to other industries, including without limitation the automotive industry, shipping industry, construction industry, and/or telecommunications industry.

Without limitation, propulsion system 1108 may include tubes that may be coupled using spreine 100, such as fuel lines. Without limitation, electrical system 1110 may include conduit that may be coupled using spreine 100, such as conduit protecting wire bundles, or isolated wire that may run in or near a fluid. Hydraulic system 1112 may include lines transporting hydraulic fluid that may be coupled using spreine 100. Environmental system 1114 may include pneumatic tunnels that may be coupled using spreine 100. Spreine 100 may be sized to fit coupling tubes of any diameter.

Apparatus and methods embodied herein may be employed during at least one of the stages of aircraft manufacturing and service method 1000 in FIG. 10. As used herein, the phrase "at least one of", when used with a list of items, means different combinations of one or more of the listed items may be used and only one of the items in the list may be needed. In other words, "at least one of" means any combination of items or number of items may be used from the list, but not all of the items in the list may be required.

Without limitation, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Without limitation, components or subassemblies produced in component and subassembly manufacturing 1006 in FIG. 10 for different advantageous embodiments may be fabricated or manufactured in a manner similar to components or subassemblies produced while aircraft 1100 is in service 1012 in FIG. 10. Also without limitation, a number of apparatus embodiments, method embodiments, or a combination thereof may be utilized during production stages, such as component and subassembly manufacturing 1006 and system integration 1008 in FIG. 10. A number, when referring to items, means one or more items. Without limitation, a number of apparatus embodiments is one or more apparatus embodiments. A number of apparatus embodiments, method embodiments, or a combination thereof may be utilized while aircraft 1100 is in service 1012 and/or during maintenance and service 1014 in FIG. 10. The use of a number of the different advantageous embodiments may substantially increase efficiency in the operation of aircraft 1100.

The illustration of aircraft manufacturing and service method 1000 in FIG. 10 is not meant to imply physical or architectural limitations to the manner in which an illustrative embodiment may be implemented. Other components in addition to or in place of the ones illustrated may be used.

Some components may be optional. Also, the blocks are presented to illustrate some functional components. One or more of these blocks may be combined, divided, or combined and divided into different blocks when implemented in an illustrative embodiment.

The description of the different illustrative embodiments has been presented for purposes of illustration and description, and is not intended to be exhaustive or limited to the embodiments in the form disclosed. Many modifications and variations will be apparent to those of ordinary skill in the art.

The illustrations of components in FIGS. 1-11 are not meant to imply physical or architectural limitations to the manner in which an illustrative embodiment may be implemented. Other components in addition to or in place of the ones illustrated may be used. Some components may be optional.

Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of connecting a first tube to a second tube, the method comprising:
   encircling, with a spreine, a sleeve encircling the first tube, via engaging a first section of the spreine with the sleeve, and connecting a second section of the spreine to the first section via engaging a nub extending from a first extension of the first section with a slot within a second extension of the second section and compressing a first joint face of the first extension of the first section against a second joint face of the second extension of the second section, thereby:
      forming a barrel via joining an arch of the first section with an arch of the second section;
      forming a first grip and a second grip, a plane passing through a central axis of the barrel bisecting each grip; and
      forming a slider for the spreine, via joining a first slider, connecting to both the arch of the first section and the first extension of the first section, to a second slider, connecting to both the arch of the second section and the second extension of the second section, such that a straight face of the first slider and a straight face of the second slider are each parallel to a same diameter of the barrel;
   aligning the first tube with the second tube;
   moving the spreine, via applying a force onto the slider for the spreine, such that the sleeve encircles the first tube and the second tube; and
   removing the spreine.

2. The method of claim 1, further comprising clamping the sleeve to the first tube and the second tube, via a clamp around the sleeve.

3. A method of fitting a sleeve about a first end of a first tube and a second end of a second tube, the method comprising:
   encircling the first tube with the sleeve, such that a leading face of the sleeve and a trailing face of the sleeve each fully encircle a portion of the first tube, the trailing face being farther from the first end than a distance from the leading face to the first end of the first tube;
   engaging the sleeve with a first section of a spreine;
   engaging the sleeve and the first section with a second section of the spreine;
   forming, via engaging a first extension of the first section with a second extension of the second section:
      a first grip of the spreine and a second grip of the spreine;
      a barrel joining an arch of the first section with an arch of the second section, a plane passing through a central axis of the barrel bisecting each grip; and
      a slider for the spreine, via joining a first slider, connecting to both the arch of the first section and the first extension of the first section, to a second slider, connecting to both the arch of the second section and the second extension of the second section, such that a straight face of the first slider and a straight face of the second slider are each parallel to a same diameter of the barrel; and
   aligning the first end with the second end; and
   fitting, via applying force to the slider for the spreine, the first tube to the second tube, via the sleeve.

4. The method of claim 3, wherein aligning further comprises axially aligning the first end with the second end.

5. The method of claim 3, wherein engaging the first section with second section further comprises: the first section and the second section being shaped substantially identical; and a nub on a first extension of the second section engaging a slot in a second extension of the first section, forming the first grip; and the nub on the first extension of the first section engaging the slot in the second extension of the second section, forming the second grip.

6. The method of claim 3, further comprising:
   removing the spreine from the sleeve; and
   clamping the sleeve to the first tube and the second tube, via a clamp around the sleeve.

7. The method of claim 3, further comprising a distance from the first end to the second end being less than a length of the sleeve.

8. The method of claim 3, wherein fitting further comprises moving the spreine toward the second tube such that the leading face encircles the second tube and the trailing face encircles the first tube.

9. The method of claim 8, wherein engaging the sleeve further comprises locating the leading face of the sleeve within a chamber of the spreine.

10. The method of claim 8, wherein moving further comprises the spreine receiving a force on at least one of: the first grip, the second grip, and a slider.

11. The method of claim 9, further comprising the chamber existing between a starter rim and a stopper rim.

12. The method of claim 11, further comprising the trailing face receiving force through contact with the stopper rim.

13. The method of claim 11, further comprising the starter rim comprising a beveled face, the beveled face comprising: a first radius to an inner edge of the beveled face being less than a second radius to an interior face of the sleeve, and a third radius to an outer edge being greater than a fourth radius to an interior face of a barrel.

14. The method of claim 11, further comprising stopping the spreine from moving the trailing face of the sleeve off the first tube, by contacting a forward face of the stopper rim against a first retainer of a first ferrule.

15. The method of claim 3, wherein the first end further comprises a first ferrule and the second end further comprises a second ferrule.

16. The method of claim 15, further comprising the first ferrule retaining a first O-ring and the second ferrule retaining a second O-ring.

17. A method of connecting a first tube to a second tube, the method comprising:
- engaging, with a first section of a spreine, a sleeve encircling the first tube;
- encircling, with the spreine, the sleeve via connecting a first extension of the first section to a second extension of a second section of the spreine and forming:
  - a barrel joining an arch of the first section with an arch of the second section;
  - a first grip and a second grip, a plane passing through a central axis of the barrel bisecting each grip; and
  - a slider for the spreine, via joining a first slider, connecting to both the arch of the first section and the first extension of the first section, to a second slider, connecting to both the arch of the second section and the second extension of the second section, such that a straight face of the first slider and a straight face of the second slider are each parallel to a same diameter of the barrel; and
- aligning the first tube with the second tube;
- moving the spreine, via applying a force onto at least one of: the first grip, the second grip, and the slider for the spreine, such that the sleeve encircles the first tube and the second tube; and
- removing the spreine.

\* \* \* \* \*